United States Patent
Cho et al.

(10) Patent No.: US 9,987,926 B2
(45) Date of Patent: *Jun. 5, 2018

(54) ELECTRONIC APPARATUS, CONTROL METHOD OF ELECTRONIC APPARATUS AND COMPUTER READABLE RECORDING MEDIUM

(71) Applicant: THINKWARE CORPORATION, Seongnam-si, Gyeonggi-do (KR)

(72) Inventors: Ho Hyung Cho, Incheon (KR); Min Kyu Cha, Seoul (KR)

(73) Assignee: THINKWARE CORPORATION, Seongnam-si, Gyeonggi-do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/604,089

(22) Filed: May 24, 2017

(65) Prior Publication Data

US 2017/0259667 A1  Sep. 14, 2017

Related U.S. Application Data

(63) Continuation of application No. 14/731,953, filed on Jun. 5, 2015, now Pat. No. 9,676,275.

(30) Foreign Application Priority Data

Jun. 5, 2014 (KR) .................. 10-2014-0068239

(51) Int. Cl.
*B60K 35/00* (2006.01)
*G01C 21/36* (2006.01)
*G01C 21/26* (2006.01)

(52) U.S. Cl.
CPC ............ *B60K 35/00* (2013.01); *G01C 21/265* (2013.01); *G01C 21/3647* (2013.01); *G01C 21/3667* (2013.01); *G01C 21/3697* (2013.01); *B60K 2350/106* (2013.01); *B60K 2350/352* (2013.01)

(58) Field of Classification Search
CPC ............. B60K 35/00; B60K 2350/352; B60K 2350/106; G01C 21/265; G01C 21/3667; G01C 21/3647; G01C 21/3697
See application file for complete search history.

(56) References Cited

U.S. PATENT DOCUMENTS

2005/0038599 A1  2/2005  Lehmann et al.
2011/0052042 A1*  3/2011  Ben Tzvi .............. G06T 19/006
                                                        382/154
2013/0286206 A1  10/2013  Ozaki et al.

FOREIGN PATENT DOCUMENTS

| CN | 101910797 A | 12/2010 |
| CN | 102141885 A | 8/2011 |
| CN | 102804181 A | 11/2012 |
| CN | 102867473 A | 1/2013 |
| CN | 103052977 A | 4/2013 |
| CN | 103471580 A | 12/2013 |

(Continued)

*Primary Examiner* — Yuen H Wong
(74) *Attorney, Agent, or Firm* — Novick, Kim & Lee, PLLC; Sang Ho Lee

(57) ABSTRACT

Provided herein is a control method of an electronic apparatus. The control method comprises generating an information for performing a driving-related guide which assists a driving of a vehicle; generating an indicator for the driving-related guide using the generated information; and displaying the generated indicator on a specific region of a road guide screen.

19 Claims, 20 Drawing Sheets

(56) References Cited

FOREIGN PATENT DOCUMENTS

| CN | 103674044 A | 3/2014 |
|---|---|---|
| JP | 2009237845 A | 10/2009 |

* cited by examiner

| Nations | Left line | Right line | Lane position |
|---------|-----------|------------|---------------|
| KR | Yellow solid line | White dotted line | First lane |
| KR | Yellow dotted line | White solid line | First lane |
| KR | White solid line | White dotted line | First lane |
| KR | White dotted line | White solid line | End lane |
| KR | White dotted line | Yellow solid line | End lane |
| KR | White solid line | Yellow dotted line | End lane |
| KR | White dotted line | Yellow dotted line | End lane |
| …. | …. | …. | … |

FIG. 9A

| Nations | Left line | Right line | Lane position |
|---------|-----------|------------|---------------|
| KR | Yellow solid line | White dotted line | First lane |
| KR | Yellow dotted line | White solid line | First lane |
| KR | White solid line | White dotted line | First lane |
| KR | White dotted line | White dotted line | Center lane |
| KR | White solid line | White solid line | Center lane |
| KR | White dotted line | White solid line | End lane |
| KR | White dotted line | Yellow solid line | End lane |
| KR | White solid line | Yellow dotted line | End lane |
| KR | White dotted line | Yellow dotted line | End lane |
| …. | …. | …. | … |

ELECTRONIC APPARATUS, CONTROL METHOD OF ELECTRONIC APPARATUS AND COMPUTER READABLE RECORDING MEDIUM

CROSS-REFERENCE TO RELATED APPLICATIONS

This application is a continuation application of U.S. nonprovisional application Ser. No. 14/731,953 filed on Jun. 5, 2015, which claims priority from Korean Patent Application No. 10-2014-0068239, filed on Jun. 5, 2014, in the Korean Intellectual Property Office, the disclosures of which are incorporated herein by reference in their entirety.

BACKGROUND OF THE INVENTION

1. Field of the Invention

The present invention concerns an electronic apparatus, a control method of the electronic apparatus and a computer readable recording medium, and in particular the present invention concerns an electronic apparatus, a control method of the electronic apparatus and a computer readable recording medium which are all designed to perform a driving-related guide so as to assist the driving of a vehicle.

2. Description of the Related Art

The most important thing when a user drives a vehicle is a safe driving and a prevention of any traffic accident. For this, a variety of assistant devices and a safety device, for example, a safety belt, an airbag, etc. are provided in a vehicle in order to perform the functional functions of vehicle component devices.

Furthermore, a device, for example, a black box, is increasingly installed in a vehicle so as to investigate the reasons for a vehicle accident when a vehicle has an accident in such a manner to store the running-related images of a vehicle and the data transferred from various sensors. A portable terminal, for example, a smart phone, a tablet, etc. is equipped with the function of a black box or a navigation application, etc. and is usually used as one of vehicle devices.

However, the applicability of such running-related images is actually low in the vehicle devices. More specifically, even though the running-related images of a vehicle are obtained through a vision sensor, for example, a camera provided in the vehicle, the electronic apparatus of the vehicle is designed to simply display or transmit such data or generate a simple alarming information, for example, a line departing state, etc.

In addition, as an electronic apparatus for a vehicle which becomes newly commercial in recent years, a HUD (Head Up Display) or an augmented reality interface are proposed, however the applicability of the running-related images of a vehicle is a simple display or a simple generation of alarming information.

SUMMARY OF THE INVENTION

The present invention is made in an effort to resolve the above-mentioned problems.

Accordingly, an object of the present invention is to provide an electronic apparatus, a control method of the electronic apparatus and a computer readable recording medium which are designed to generate an indicator for providing a driving-related guide which assists the driving of a vehicle and display the generated indicator on a specific region of a road guide screen.

To achieve the above objects, a control method of an electronic apparatus according to an embodiment of the present invention may include, but not limited to, generating an information for performing a driving-related guide which assists a driving of a vehicle; generating an indicator for the driving-related guide using the generated information; and displaying the generated indicator by overlapping the generated indicator on a specific region of a road guide screen.

In addition, the step for generating an information for performing the driving-related guide generates an information for performing the driving-related guide which includes at least one among a signal type information of a signal lamp, a line information with respect the line on which the vehicle is located, a position information of the line on which the vehicle is located, a distance information to another vehicle positioning in front of the vehicle, and a route information for the road guide.

In addition, there is further provided a step for determining an essential guide, which assists a driving of the vehicle, among a lane departure guide, a forward vehicle collision prevention guide, a signal change guide of a signal lamp, a lane change guide, by using the generated information.

In addition, the road guide screen is an augmented reality (AR) road guide screen.

In addition, the indicator may include, but not limited to, a first region for performing the forward vehicle collision prevention guide; a second region which is formed at left and right sides of the first region so as to perform the line departure guide; a third region which is formed at the tops of the first and second regions so as to perform the signal change guide; and a fourth region which is formed passing through the second region and performs the lane change guide.

In addition, the indicator may include, but not limited to, a first region for guiding the forward vehicle collision prevention guide; a third region which is formed at the top of the first region and performs the signal change guide; and a fourth region for performing the lane change guide, wherein the second region for the line departure guide is formed at a portion of the line of the AR road guide screen.

In addition, the step for generating the indicator generates an indicator which activates the region corresponding to the determined guide.

In addition, there may be further provided determining a vanishing point in an image data in relation with the driving of a vehicle; and determining a specific region for displaying the indicator, on the AR road guide screen based on the determined vanishing point.

In addition, the step for determining a specific region to display the indicator provides to determines a specific region on which the indicator is displayed, wherein the region is formed at a specific distance above the determined vanishing point.

To achieve the above objects, an electronic apparatus may include, but not limited to, a display unit configured to display a screen; a guide-related information generation unit configured to generate an information for performing a driving-related guide which assists a driving of a vehicle; an indicator generation unit configured to generate an indicator for the driving-related guide using the generated information; and a control unit configured to control the display unit so that the generated indicator is displayed overlapping on a specific region of a road guide screen.

In addition, the guide-related information generation unit generates an information for performing the driving-related guide which includes at least one among a signal type information of a signal lamp, a line information with respect to the lane on which a vehicle is located, a position information of the line where the vehicle is located, a distance information to another vehicle positioning in front of the vehicle, and a route information for the road guide.

In addition, the guide-related information generation unit determines an essential guide, which assists a driving of the vehicle, among a line departure guide, a forward vehicle collision prevention guide, a signal change guide of a signal lamp, a lane change guide and a line departure guide, by using the generated information.

In addition, the road guide screen is an augmented reality (AR) road guide screen.

In addition, the indicator may include, but not limited to, a first region for performing the forward vehicle collision prevention guide; a second region which is formed at left and right sides of the first region so as to perform the line departure guide; a third region which is formed at the tops of the first and second regions so as to perform the signal change guide; and a fourth region which is formed passing through the second region and performs the lane change guide.

In addition, the indicator may include, but not limited to, a first region for guiding the forward vehicle collision prevention guide; a third region which is formed at the top of the first region and performs the signal change guide; and a fourth region for performing the lane change guide, wherein the second region for the line departure guide is formed at a portion of the line of the AR road guide screen.

In addition, the indicator generation unit generates an indicator which activates the region corresponding to the determined guide.

In addition, the indicator generation unit determines a specific region for displaying the indicator, on the AR road guide screen based on a vanishing point, wherein the vanishing point is determined from the image data in relation with the driving of the vehicle.

In addition, the indicator generation unit determines as a specific region where the indicator displays, wherein the specific region is formed at a specific distance above the determined vanishing point.

Meanwhile, to achieve the above objects, the computer readable recording medium according to an embodiment of the present invention may has a program code for executing the above-described control method on a computer.

According to the above various embodiments of the present invention, a driving-related guide, for example, a line departure guide, a forward vehicle collision prevention guide, a signal change guide of a traffic light, a lane change guide, a line departure guide, etc. can be executed. Therefore, it is possible to promote a driver's safety driving and a convenience with respect to the vehicle.

In addition, according to the above various embodiments of the present invention, each position of a plurality of guide regions are desired in the indicator to correspond to the situations of roads, thus providing the guides to the driver in more intuitive ways.

According to the above various embodiments of the present invention, the indicator for the sake of a driving-related guide is displayed overlapping on the road guide screen of the augmented reality (AR), which may consequently provide the driver with guides in more intuitive ways.

In addition, according the above various embodiments of the present invention, the position of the indicator displayed on the road guide screen of the augmented reality (AR) is in the region that is a specific distance away from the vanishing point, so the driver can be provided with the guide in more intuitive ways.

BRIEF DESCRIPTION OF THE DRAWING

FIGS. 9A and 9B are views depicting a lane decision table according to an embodiment of the present invention.

DETAILED DESCRIPTION OF THE PREFERRED EMBODIMENT

Figure 1:
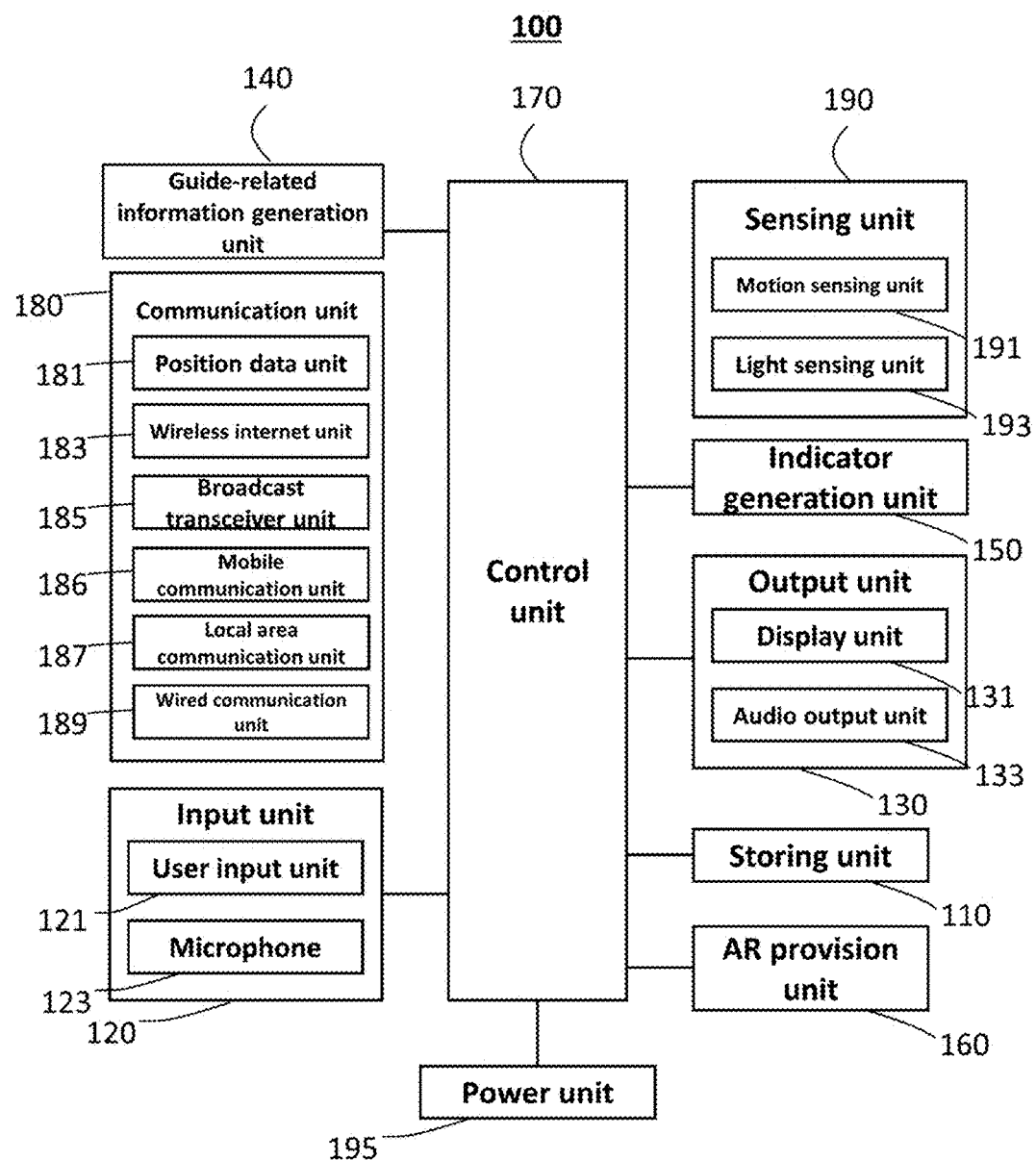
FIG. 1 is a block diagram depicting an electronic apparatus according to an embodiment of the present invention.

The descriptions hereinafter propose the principles of the invention, so it is obvious that a person having ordinary skill in the art can implement the principle of the invention even though it is not described or depicted in the present specification and can invent various apparatuses included in the concept and scope of the invention. In addition, it should be understood that the conditional terms and embodiments listed in the present invention are principally intended to help the concepts of the present invention to be fully understood, not limiting the listed embodiments and states.

In addition, it should be understood that all the detailed descriptions listing the principle, view point and embodiments as well as specific embodiments of the present invention are intended to include the structural and functional equivalents of these matters. In addition, it should be understood that these equivalent matters include all the devices invented to perform the same functions irrespective of the currently known equivalent matters as well as the equivalent matters, namely, structures which will be developed in the future.

Therefore, for example, it should be understood that the block diagrams of the present specification are intended to show the conception view points of the exemplary circuits which embody the principles of the present invention. In similar ways, all the flows, state conversion diagrams, pseudo codes, etc. may be substantially expressed on a computer readable medium and may represent various processes which can be executed by a computer or a processor irrespective of whether the computer or the processor is clearly illustrated or not.

The functions of various element depicted in the drawings and including the processor or the functional blocks indicates in the form of similar concepts may be executed using an exclusive hardware as well as the hardware which has abilities to execute the related software. When it is provided by the processor, the above functions may provided by a single exclusive processor, a single shared processor or a plurality of individual processors, and a part of them may be shared.

The correct use of the processor or the term which is suggested as a concept similar therewith should not be interpreted in such a way to exclusively cite the hardware which has an ability to execute software, and it should be interpreted that it is indented to implicitly include ROM, RAM and a nonvolatile memory. Well known other hardware may be included.

In the claims of the present specification, the components expressed as a method for executing the functions recited in the detailed descriptions are intended to include all the methods for executing the functions which include all types of software including a combination of circuit elements performing, for example, the above functions or a firmware/micro code, etc. and may be combined with an appropriate circuit to execute the software. It should be understood that the present invention defined by such claims is combined with the functions provided by variously listed means and with the ways that the claims require, so any means for providing the above functions should be understood to be equivalent to what can be recognized from the present specification.

The above-described objects, features and advantages could become clear with the aid of the following descriptions in relation with the accompanying drawings, and a person having ordinary skill in the art to which the present invention pertains can easily implement the technical concepts of the present invention. In addition, while the present invention is being described, if it is judged that the descriptions with respect to the known technology in relation with the present invention may make unclear the subject matters of the present invention, such detailed descriptions would be omitted.

Various embodiments of the present invention will be described with reference to the accompanying drawings.

FIG. 1 is a block diagram depicting an electronic apparatus according to an embodiment of the present invention. Referring to FIG. 1, the electronic apparatus 100 may include, but not limited to, all or part of a storing unit 110, an input unit 120, an output unit 130, a guide-related information generation unit 140, an indicator generation unit 150, an augmented reality provision unit 160, a control unit 170, a communication unit 180 and a sensing unit 190.

Here, the electronic apparatus 100 may be implemented using a smart phone, a tablet computer, a palm computer, a PDA (Personal Digital Assistant), a PMP (Portable Multimedia Player), a smart glass, a project glass, a navigation, a black box, etc. each of which may provide to a vehicle driver a driving-related information.

Here, the driving state of the vehicle may include, not limited to, a variety of states where the vehicle is being driven by a driver, for example, a stopping state of the vehicle, a running state of the vehicle, a parking state of the vehicle, etc.

The driving-related guide may include, not limited to, a variety of guides to assist the driving of a vehicle driver, for example, a road guide, a line departure guide, a signal guide, a signal change guide, a forward vehicle collision guide, a lane change guide, a lane guide, etc.

Here, the road guide may include, but limited to, an augmented reality road guide performing road guide by combining various information, for example, a user's position, direction, etc. with the images of the forward scenes of the currently driving vehicle, and a 2D (2-Dimensional) or 3D (3-Dimensional) road guide performing a road guide by combing the map data of the 2D or 3D with various information, for example, a user's position, direction, etc. Here, the road guide may be interpreted as an occasion wherein a driver drives on the vehicle as well as a concept including a road guide where a user moves walking or running.

In addition, the line departure guide may be a guide to guide whether the running vehicle departs from the line or not.

In addition, the forward vehicle collision prevention guide may be a guide for guiding a collision with the forward vehicle when the distance to the vehicle which stops in front of the stopping or running vehicle becomes within a specific distance. Here, the forward vehicle collision prevention guide may be a concept including a forward vehicle start guide for guiding whether the vehicle in front of the stopping vehicle starts or not.

In addition, the signal guide may be a guide for guiding the signal states of a signal lamp positioned in front of the driving vehicle, for example, a stop signal, a straight signal, a left turn signal, a right turn signal, etc. Here, the colors and types corresponding to each signal may be different for each nation. In case of Korea, the stop signal is a red color, the straight signal is a green color, the left turn signal is a green color and a left turn arrow, and the right turn signal is a green color and a right turn arrow.

In addition, the signal change guide may be a guide for guiding that the signal state, for example, a signal lamp positioned in front of the driving vehicle, has changed. For an example, if the signal changed from the stop signal to the straight signal, this may be guided.

In addition, the lane change guide may a guide for guiding a change from the line where the vehicle is positioned to another line for the sake of a route guide to the destination.

In addition, the lane guide may be a guide for guiding the line where the vehicle is currently positioned.

The driving-related images which help various driving guide functions may be photographed in real time by the camera hung in the forward direction. Here the camera may be a camera which may be integrally formed with the electronic apparatus 100 hung in the vehicle so as to photograph the forward scenes of the vehicle. In this case, the camera may be integral with the smart phone, the navigation or the black box, and the electronic apparatus 100 may receive the images photographed by the integral camera.

As another example, the camera may be hung different from the electronic apparatus 100 and may photograph the forward scenes of the vehicle. In this case, the camera may be a separate black box which hung for the forward direction of the vehicle, and the electronic apparatus 100 may receive the photographed images based on a wired/wireless communication with the separately hung black box or may receive the photographed images when a storing medium for storing the photographed images of the black box is inserted in the electronic apparatus 100.

Hereinafter, the electronic apparatus 100 according to an embodiment of the present invention will be described in more details based on the above contents.

The storing unit 110 has a function for storing various data and applications which are necessary for the operations of the electronic apparatus 100. In particular, the storing unit 110 may store the data necessary for the operations of the electronic apparatus 100, for example, OS, a route search application, a map data, etc. In addition, the storing unit 110 may store the data generated by the operations of the electronic apparatus 100, for example, a searched route data, a received image, etc. In addition, the storing unit 110 may store a position-related information, a line judgment table, etc. of signals included in the signal lamp.

Here, the storing unit 110 may be implemented using a built-in type storing element, for example, RAM (Random Access Memory), Flash Memory, ROM (Read Only Memory), EPROM (Erasable Programmable ROM) EEPROM (Electronically Erasable and Programmable ROM), a register, a hard disk, a removable disk, a memory card, USIM (Universal Subscriber Identity Module), etc. or a detachable type storing element, for example, a USB memory, etc.

The input unit 120 has a function for converting physical input from the outside of the electronic apparatus 100 into a specific electrical signal. Here, the input unit 120 may be all or part of a user input unit 121 and a microphone unit 123.

The user input unit 121 may receive a user's input, for example, a touch, a push operation, etc. Here, the user input unit 121 may be implemented using at least one among a various button types touch sensor which receive touch inputs, and a near sensor for receiving an approaching motion.

The microphone unit 123 may receive a user's voice and sound from the inside or outside of the vehicle.

The output unit 130 is a device for outputting the data of the electronic apparatus 100. Here, the output unit 130 may be all or part of a display unit 131 and an audio output unit 133.

The display unit 131 is a device for outputting data that the electronic apparatus 100 may visually recognize. The display unit 131 may be implemented with a display unit provided at a front side of the housing of the electronic apparatus 100. Here, the display unit 131 is formed integral with the electronic apparatus 100 and may output a visual recognition data and is installed separate from the electronic apparatus 100 like the HUD and may output a visual recognition data.

The audio output unit 133 is a device for outputting the data that the electronic apparatus 100 may audibly recognize. The audio output unit 133 may be formed of a speaker which may output in the forms of sound the data which should be informed to the user of the electronic apparatus 100.

The communication unit 180 may provide to communicate with another device. The communication unit 180 may include, not limited to all or part of a position data unit 181, a wireless internet unit 183, a broadcast transceiver unit 185, a mobile communication unit 186, a local area communication unit 187 and a wired communication unit 189.

The position data unit 181 is a device for obtaining the position data through the GNSS (Global Navigation Satellite system). The GNSS means a navigation system which may calculate the position of the receiver terminal using radio signals from the satellite. As an example of the GNSS, there may, based on its operation body, be GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The position data unit 181 of the electronic apparatus 100 according to an embodiment of the present invention may obtain a position data by receiving a GNSS signal which is served in a region where the electronic apparatus 100 is being used.

The wireless internet unit 183 is a device for connecting to the wireless internet, thus obtaining or transmitting the data. The wireless internet unit through the wireless internet unit 183 for connecting to the wireless internet may include, but not limited to, WLAN (Wireless LAN), Wibro (Wireless broadband), Wimax (World interoperability for microwave access), HSDPA (High Speed Downlink Packet Access), etc.

The broadcast transceiver unit 185 is a device for transmitting and receiving broadcast signals through various broadcast systems. The broadcast system for transmitting and receiving through the broadcast transceiver 185 may include, but not limited to, DMBT (Digital Multimedia Broadcasting Terrestrial), DMBS (Digital Multimedia Broadcasting Satellite), MediaFLO (Media Forward Link Only), DVBH (Digital Video Broadcast Handheld), ISDBT (Integrated Services Digital Broadcast Terrestrial), etc. The broadcast signal which may be transmitted or received through the broadcast transceiver unit 185 may include, but not limited to, a traffic data, a life data, etc.

The mobile communication unit 186 may communicate by connecting to a mobile communication network in compliance with various mobile communication criteria, for example, 3G (3rd Generation), 3GPP (3rd Generation Partnership Project), LTE (Long Term Evolution), etc.

The local area communication unit 187 is a device for the sake of a local area communication. The local area communication unit 187 may provide to communicate through Bluetooth, RFID (Radio Frequency Identification), infrared ray communication (IrDA, Infrared Data Association), UWB (Ultra WidBand), ZigBee, NFC (Near Field Communication), Wi-Fi, etc.

The wired communication unit 189 is an interface device for connecting the electronic apparatus 100 to another device through a wired connection. The wired communication unit 189 may be a USB module which may communicate through the USB port.

The communication unit 180 may communicate with another device using at least one of the position data unit 181, a wireless internet unit 183, a broadcast transceiver unit 185, a mobile communication unit 186, a local area communication unit 187, and a wired communication unit 189.

As an example, in case where the electronic apparatus 100 does not include a camera function, using at least one of the local area communication unit 187 and the wired communication unit 189, it is possible to receive the images taken by the vehicle camera, for example, a black box, etc.

As another example, in case where a communication is made to multiple devices, any one of them communicate with the local area communication unit 187, and the other one of them may communicate through the wired communication unit 189.

The sensing unit 190 is a device for detecting the current state of the electronic apparatus 100 and may include, but not limited to, all or part of a motion sensing unit 191 and a light sensing unit 193.

The motion sensing unit 191 may detect the motion in the 3D space of the electronic apparatus 100. The motion sensing unit 191 may be a 3-axis geomagnetic sensor and a 3-axis acceleration sensor. The motion data obtained by the motion sensing unit 191 is combined with the position data obtained by the position data unit 181, thus calculating a more accurate trace than the vehicle with the electronic apparatus 100.

The light sensing unit 193 is a device for measuring surrounding illuminance of the electronic apparatus 100 and allows to change the brightness of the display unit 131 to the surrounding brightness using the illuminance data obtained through the light sensing unit 193.

The power unit 195 is a device for supplying power which is necessary for the operation of the electronic apparatus 100 and the operation of another device connected to the electronic apparatus 100. The power unit 195 may be a device for receiving power from external power source, for example, a battery in the electronic apparatus 100 or a vehicle. In addition, the power unit 195 may, depending on the type for receiving power, be implemented in the form of a wired communication module 119 or a device for receiving power through a wireless connection.

Meanwhile, the control unit 170 control the whole operations of the electronic apparatus 100. In more detail, the control unit 170 may control all or part of the storing unit 110, the input unit 120, the output unit 130, the guide-related information generation unit 140, the indicator generation unit 150, the AR provision unit 160, the communication unit 180 and the sensing unit 190.

In particular, the control unit 170 may control for a guide-related information generation unit 140 to generate information to perform the driving-related guide which assists the driving of the vehicle and may control for an indicator generation unit 150 to generate an indicator for the driving-related guide using the generated information and may control for the display unit 131 to display the generated indicator, while overlapping on a specific region of the road guide screen.

Figure 2:
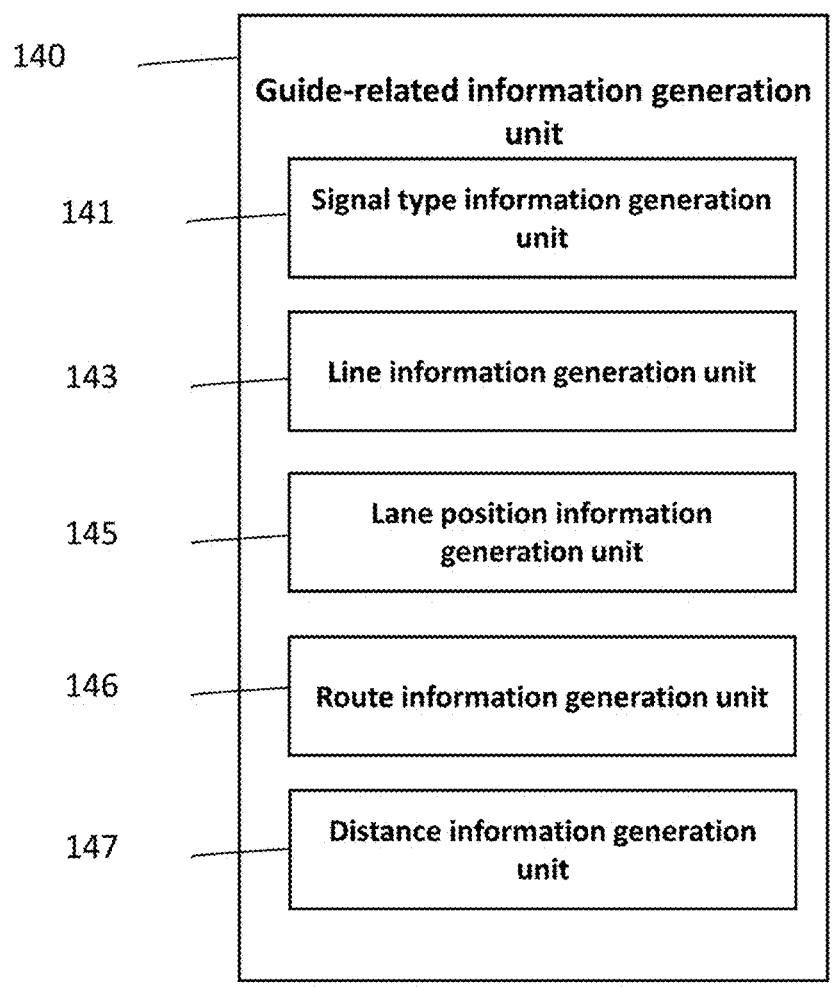
FIG. 2 is a block diagram depicting in detail a guide-related information generation unit according to an embodiment of the present invention.

Here, referring to FIG. 2, the guide-related information generation unit 140 may include, but not limited to, a signal type information generation unit 141 for generating a signal type information of a signal lamp, a line information generation unit 143 for generating a line information with respect to the lane on which the vehicle is located, a lane position information generation unit 145 for generating the position information of the line on which the vehicle is located, a route information generation unit 146 for generating a route information for the sake of a road guide to the set destination, and a distance information generation unit 147 for generating a distance information to another vehicle positioning in front of the vehicle. The method for generating the information of the guide-related information generation unit 140 will be described with reference to FIGS. 4 to 9.

Meanwhile, the indicator generation unit 150 may, using the information generated by the guide-related information generation unit 140, determines an essential guide, which assists a driving of the vehicle, among a line departure guide which assists the driving of a vehicle, a forward vehicle collision prevention guide, a signal change guide of a signal lamp, a lane change guide and a line departure guide.

Here, the indicator may be a form designing in such a manner to correspond each position of multiple guide regions in the indicator to a road situation in order for the driver to perform a guide in a more intuitive way.

As an example, the indicator may include, but not limited to, a first region for performing a forward vehicle collision prevention guide, a second region which is formed at left and right sides of the first region so as to perform a line departure guide, a third region which is formed at the top of the second region so as to perform a signal change guide, and a fourth region which passes through the second region so as to perform a lane change guide.

In addition, the indicator may, as another example, include, but not limited to, a first region for performing a forward vehicle collision prevention guide, a third region which is formed at the top of the first region so as to perform a signal change guide, and a fourth region for performing a lane change guide. In this case, the second region for the sake of a line departure guide may position on a portion of the line of the AR road guide screen.

In this case, the indicator generation unit 150 may generate an indicator which activates a region corresponding to the guide which needs to be done among multiple regions included in the indicator.

In addition, the indicator generation unit 150 may determine a specific region where an indicator is displayed on the AR road guide screen based on the vanishing point determined in the driving-related image data of the vehicle. Here, the indicator generation unit 150 extracts a line from the photographed images by the camera during the driving of the vehicle, and the extracted line is extended, and the crossing point may be determined as a vanishing point. In addition, the indicator generation unit 150 may determine the region is formed at a specific distance to the determined vanishing point as a specific region where the indicator is displayed.

Meanwhile, the control unit 170 may control for the output unit 130 to perform a driving-related guide of the vehicle. More specifically, the control unit 170 may control for the display unit 131 to display overlapping the indicator generated by the indicator generation unit 150 on a specific region of the road guide screen. In addition, the control unit 170 may control for the audio output unit 133 to output in voice the driving-related guide of the vehicle.

In addition, the control unit 170 may control for the electronic apparatus 100 to perform a driving-related guide based on the AR in cooperation with the AR provision unit 160. Here, the AR may be a way for providing additional information (for example, the graphic elements showing the point of interest (POI), the graphic elements showing the route to the destination, etc.) in such a way to visually overlap the additional information on a screen which contains the real world that the user is actually seeing. As an example, the AR may be provided using the HUD which uses the wind shield of the vehicle or an image overlay which uses a separate image output device. The AR provision unit 160 may generate a real image and an interface image, etc. which overlaps on the glass. Based on the above features, it is possible to implement an AR navigation or a vehicle infortainment system.

Figure 3:
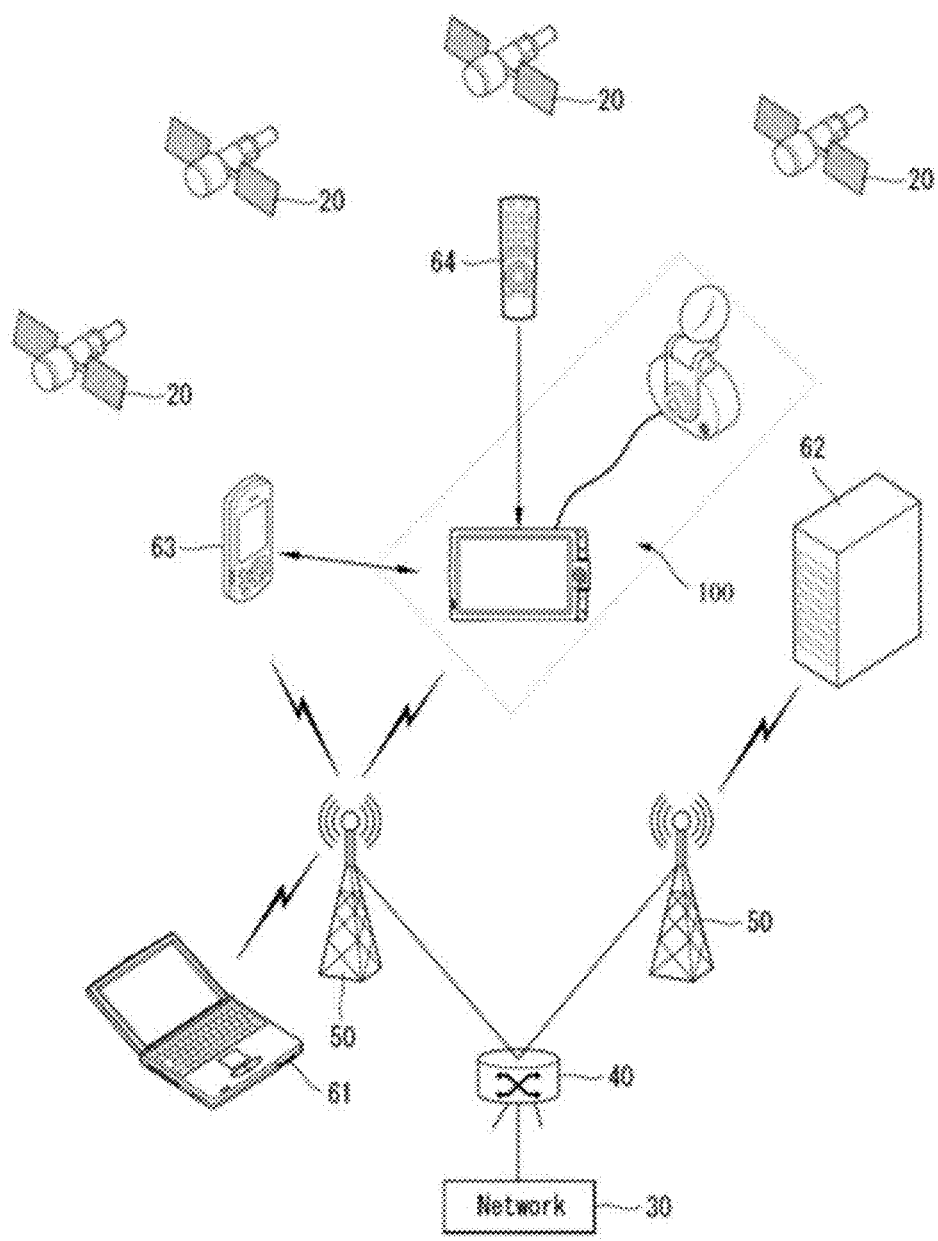
FIG. 3 is a view for describing a system network connected to an electronic apparatus according to an embodiment of the present invention.

FIG. 3 is a view for describing a system network which is connected to another electronic apparatus according to an embodiment of the present invention. Referring to FIG. 3, the electronic apparatus 100 of an embodiment of the present invention may be implemented using various devices provided in the vehicle, for example, a navigation, a black box, a smart phone or other vehicle AR interface provision device and may be connected with various communication networks and other electronic devices 61 to 64.

In addition, the electronic apparatus 100 may calculate the current position and current timing in cooperation with a GPS module in accordance with a radio signal from the satellite.

Each satellite 20 may transmit or receive L-band frequencies the frequency bands of which are different. The electronic apparatus 100 may calculate the current position based on the time which has lapsed until the L-band frequency from each satellite 20 reaches the electronic apparatus 100.

Meanwhile, the electronic apparatus 100 may connect to the network 30 in a wireless way through the communication unit 180 and through the control station 40 (ACR) and the base station 50 (RAS). When the electronic apparatus 100 gets connected to the network 30, it may indirectly connected to the electronic devices 61 and 62, thus exchanging the data.

Meanwhile, the electronic apparatus 100 may indirectly connect to the network 30 through another device 63 which has a communication function. For example, in case where the electronic apparatus 100 is not equipped with a module which may connect to the network 30, it is possible to communicate with another device 63 which has a communication function through the local area communication module.

Figure 4:
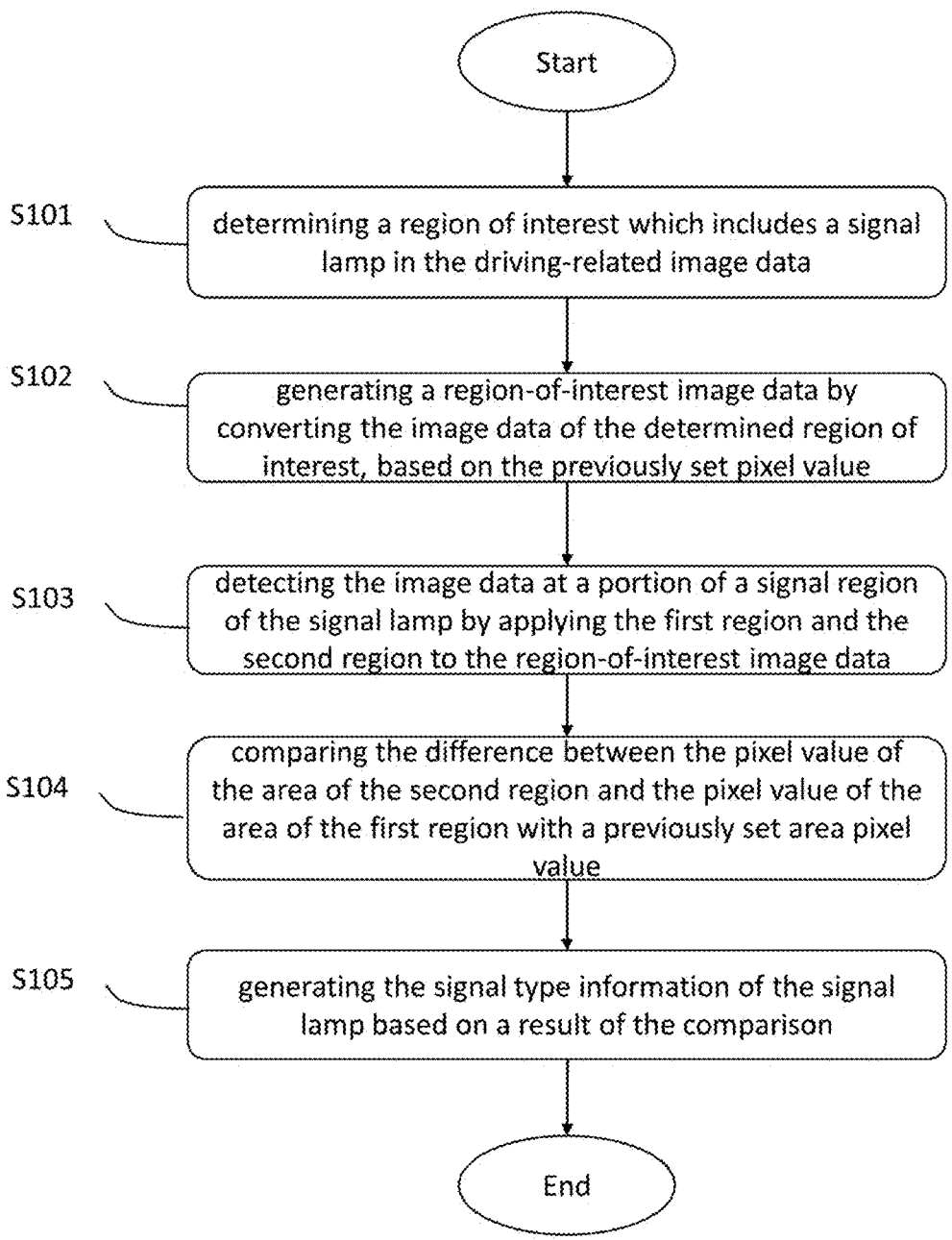
FIG. 4 is a flow chart depicting a signal type information generation operation according to an embodiment of the present invention.

FIG. 4 is a flow chart depicting the signal type information generation operation according to an embodiment of the present invention. Referring to FIG. 4, the signal type information generation unit 141 may determine a region of interest which includes a signal lamp, in the driving-related image data (S101). The signal type information generation unit 141 may determine the upper region of the determined vanishing point as the region of interest, because the signal lamp is located on the upper region of the vanishing point of the driving-related image data. Meanwhile, as another example, the signal type information generation unit 141 may determine, as the region of interest, the previously set specific region, in the driving-related image data.

And, the signal type information generation unit 141 may generate a region-of-interest image data by converting the image data of the determined region of interest, based on the previously set pixel value (S102). In this case, the signal type information generation unit 141 may, as an example, generate the region-of-interest image data by adapting to the formula 1 the image data of the determined region of interest.

$$\frac{x \times R + y \times G + z \times B}{256} + K \qquad \text{[Formula 1]}$$

Here R, G, B represent the R, G, B values of the image data of the determined region of interest, and K represents the previously set pixel value which is a criteria of the conversion, and x, y, x represent specific coefficients. For example, K may be 128 which is the average pixel value.

Therefore, the signal type information generation unit 141 may generate the region-of-interest image data which clearly distinguishes from the signal region portion of the signal lamp.

Meanwhile, the color and/or forms corresponding to each of the multiple signal included in the signal lamp may different from each nation. In case of Korea, the stop signal is a red signal, a straight signal is a green signal, the left turn signal is a green left arrow, and a right turn signal is a green right arrow.

Therefore, the above previously set pixel values and the x, y, z may have different values depending on the algorithm.

Meanwhile, the signal type information generation unit 141 may detect the image data at a portion of a signal region of the signal lamp by applying the first region and the second region to the region-of-interest image data (S103). In more detail, the signal type information generation unit 141 may detect the image data of the signal region portion of the signal lamp by applying a second region having a second area to the region-of-interest image data and a second region including the first region and having a second area. Here, the first and second regions may be forms corresponding to the forms of the signal of the signal lamp. As an example, in case where the signal of the signal lamp is circular, elliptical or quadrangular, the first and second regions may be circular, elliptical and quadrangular.

Meanwhile, the signal type information generation unit 141 may compare the difference between the pixel value of the area of the second region and the pixel value of the area of the first region with a previously set area pixel value (S104). Here, the previously set area pixel values may change by reflecting the color and/or forms corresponding to the multiple signals included in the signal lamp.

In addition, the signal type information generation unit 141 may generate the signal type information of the signal lamp based on a result of the comparison (S105).

The steps S103, S104, S105 will be described in details with reference to FIG. 5.

Figure 5:
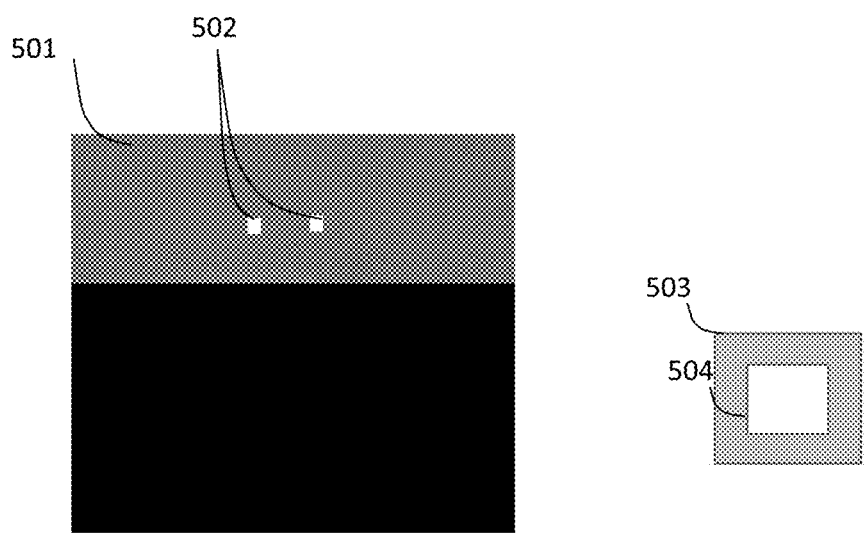
FIG. 5 is a view depicting a region-of-interest image data corresponding to a stop signal, and a stop signal judging method according to an embodiment of the present invention.

FIG. 5 is a view depicting a method for judging a region-of-interest image data and a stop signal corresponding to a stop signal according to an embodiment of the present invention. In case where the signal lamp is a red stop signal, the signal type information generation unit 141 converts the image data in the region of interest including the signal lamp based on a previously set pixel value, as depicted in FIG. 5 the region-of-interest image data 501 may be generated. Here, the red stop signal of the signal lamp may be generated like 502 based on the region-of-interest image data 501.

In this case, the signal type information generation unit 141 may detect the image data of the signal region portion 502 of the signal lamp by applying the first region 504 and the second region 503 to the region-of-interest image data 501.

And, the signal type information generation unit 141 compares the difference between the area pixel value of the second region 503 and the area pixel value of the first region 504 with a previously set area pixel value, thus generating a signal type information of the signal lamp. As an example, the signal type information generation unit 141 may judge the signal type information as a stop signal if the difference between the area pixel value of the second region 503 and the area pixel value of the first region 504 is smaller than the previously set area pixel value (namely, as depicted in FIG. 5, the area pixel value of the first region 504 is larger).

Though omitted in FIG. 5, the judgment on the turn signals, for example, a straight signal, a left turn signal and a right turn signal, may be performed in the similar way. As an example, the signal type information generation unit 141 may judge a turn signal using the above method and/or the shapes (for example, a shape of an arrow) of the image data at the signal region portion of the signal lamp.

According to the method for generating the signal type information generation as depicted in FIG. 5, the signal type information may be judged in a state where the image data of the region of interest is standardized based on the previously set pixel value, so the signal type information may be quickly judged during the driving wherein the running and stop alternately and often change.

Meanwhile, the signal type information generation method as depicted in FIG. 5 has been provided only for illustrative purposes, but not limited to. Therefore, various kinds of signal type information generation methods, for example, judging a signal type information in such a manner to detect a red signal corresponding to the stop signal from the driving-related image data, which is a color image or in such a manner to detect a green signal corresponding a straight signal may be used.

Meanwhile, according to an embodiment of the present invention, if the signal type information is judged as a stop signal, the signal type information generation unit 141 may previously position the first region and the second region in the region where the start signal and the turn signal like the left turn/right turn in the region-of-interest image data. In this case, the signal type information generation unit 141 may previously position in the above position the first region and the second region using the position-related information of multiple signals stored in the storing unit 110. In this case, it is possible to quickly judge the changes from the stop signal to the turn signals, for example, the straight signal or left turn/right turn signals by increasing the image process speed.

Figure 6:
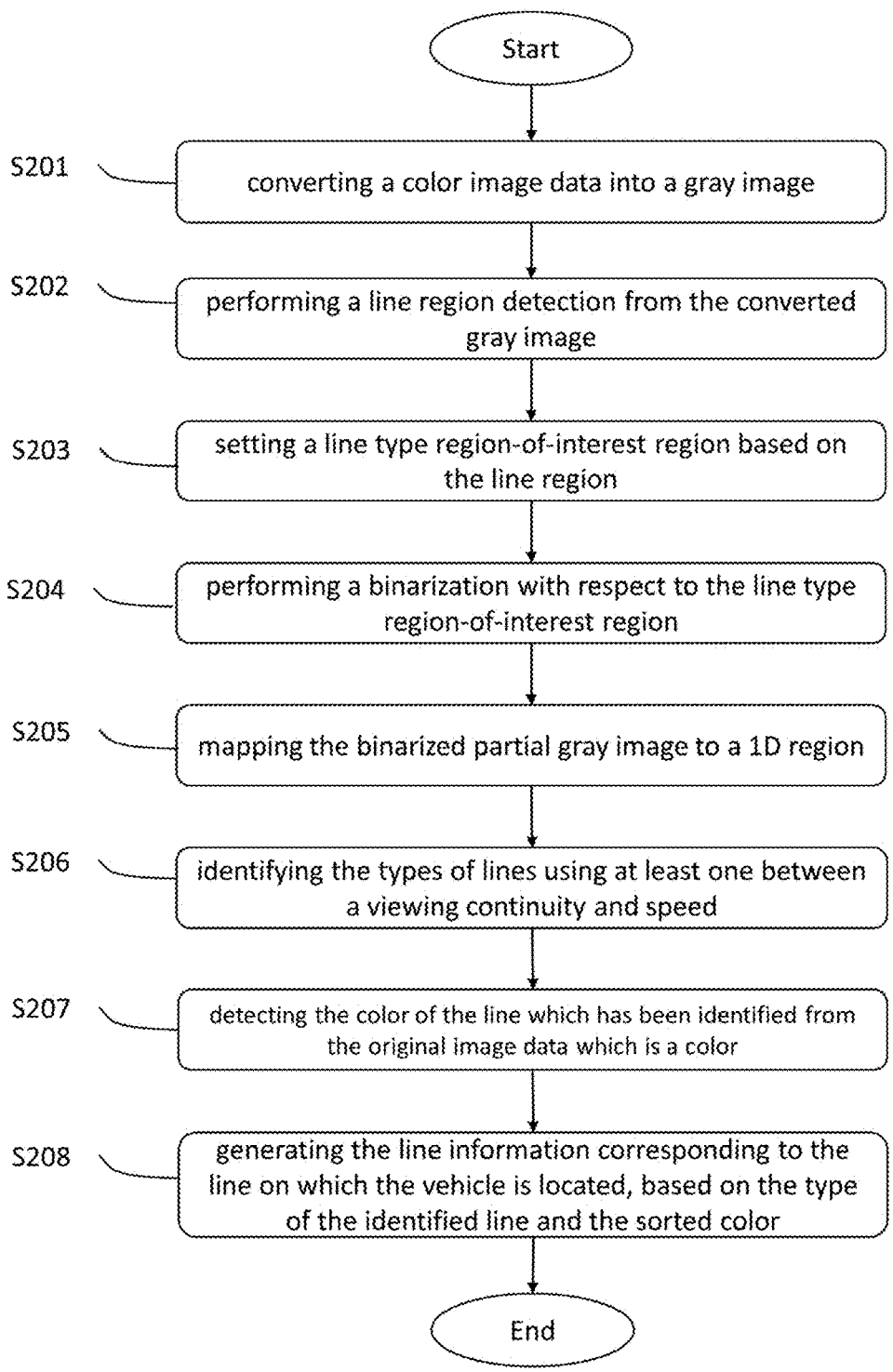
FIG. 6 is a flow chart depicting a line information generation method according to an embodiment of the present invention.

FIG. 6 is a flow chart for describing in detail the method for generating a line information according to an embodiment of the present invention. Referring to FIG. 6, the line information generation unit 143 may convert a color image data into a gray image (S201), and may perform a line region detection from the converted gray image (S202).

In more detail, the line information generation unit 143 may extract a region for detecting lines from the photographed driving-related images. Also, the line information generation unit 143 may previously perform a light source compensation with respect to the original image in order to minimize any shadow effects since it is hard to detect lines if part of the road is affected by the shadow.

And, the line information generation unit 143 may detect as a line region the region where the line may exist based on the previously determined position of the camera or the installation angle of the camera. As an example, the line information generation unit 143 may determine the line region about a position where the line may begin. Also, the line information generation unit 143 may estimate the position where the line region begins and the length of the line region as the width (the maximum width between the left line region and the right line region) in the driving-related image and the viewing angle of the camera.

Also, the line information generation unit 143 may convert the gray image corresponding to the line detection region into an edge image and may detect the line region based on the straight position extracted from the converted edge image. More specifically, the driving-related image may be converted into an edge image through various known algorithms. The edge image may include an edge which shows multiple straight lines. At this time, the line information generation unit 143 may recognize as a line the detected straight line. Also, the line information generation unit 143 may determine the line region based on the position of the straight line which has the width of a constant line width with respect to the running direction of the vehicle among multiple straight line candidates.

Thereafter, if the line region is detected, the line information generation unit 143 may set a line type region-of-interest region based on the line region (S203). In detail, if the line region is detected, the line information generation unit 143 may set a line type region-of-interest region (ROI) based on the detected line region. The line type region-of-interest region may mean the portion of the driving-related image which includes the line and its surrounding region so as to judge the types and colors of the lines.

Thereafter, the line information generation unit 143 may perform a binarization with respect to the line type region-of-interest region (S204) and maps the binarized partial gray image to a 1D region (S205) and may identify the types of lines using at least one between a viewing continuity and speed (S206).

The line information generation unit 143 may extract a partial gray image of the line type region-of-interest region from the converted gray image and performs a binarization with respect to the partial gray image. So, the line information generation unit 143 can clearly distinguish only the portion judged to be a line, from the partial gray image.

And, the line information generation unit 143 can map, to a 1D region, each line (left line and right line) which can be recognized in the binarized partial gray image. In addition, the types of lines can be identified by analyzing the pattern of each line mapped to the 1D region.

Figure 7:
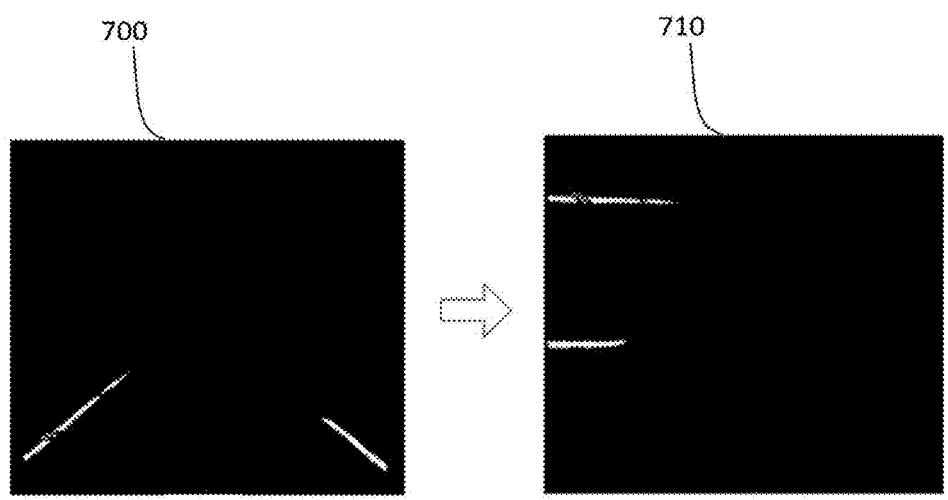
FIG. 7 is a view depicting a line type region-of-interest binarization and a 1-dimensional mapping in a gray image according to an embodiment of the present invention.

In more detail, FIG. 7 depicts a line type region-of-interest binarization and a 1D mapping in the gray image.

As depicted in FIG. 7, if a binarization with respect to the line type region-of-interest is performed, a binarized image 700 may be obtained. In the binarized image 700, the portion appearing in white may be identified as a line, the other portions may be identified as black.

And, each line identified in the binarized image 700 may be mapped to a 1D region. The line information generation unit 143 may easily identify the types of lines using the image 710 mapped to the 1D region.

For example, the line information generation unit 143 may judge the dotted line or solid line based on the start point and length feature of each line mapped to the 1D. Also, the line information generation unit 143 may judge the dotted line or solid line using continuity with respect to time of each line mapped to the 1D and using the speed. And, the line information generation unit 143 firstly determines the dotted line or solid line based on the start point and length feature and then secondarily determines the dotted line or solid line using the time continuity and speed.

More specifically, the line information generation unit 143 may determine the dotted line or solid line by comparing and judging the line length based on the position of the start point of each line. In this case, the line information generation unit 143 may judge the dotted line or solid line using only one image frame.

Also, the line information generation unit 143 may clearly judge if a line is a dotted line or a solid line depending on whether each line is continuously formed or not as time passes. As an example, the line information generation unit 143 may previously set a continuity level based on the moving speed of the line in the image and may judge as a dotted line if the continuity of each line is lower than the value of a previously set continuity level.

Therefore, according to the embodiment of the present invention, the dotted line or the solid line is previously identified using one frame, and such identification may be proved using a continuous frame, thus finally judging the type of line.

Thereafter, the line information generation unit 143 may detect the color of the line which has been identified from the original image data which is a color (S207).

The line information generation unit 143 may detect the color at a portion corresponding to the line the which has been identified, by analyzing a color image and sorts the same. As an example, the line information generation unit 143 may sort the detected color into white, yellow or blue.

Thereafter, the line information generation unit 143 may generate the line information corresponding to the line on which the vehicle is located, based on the type of the identified line and the sorted color (S208).

Figure 8:
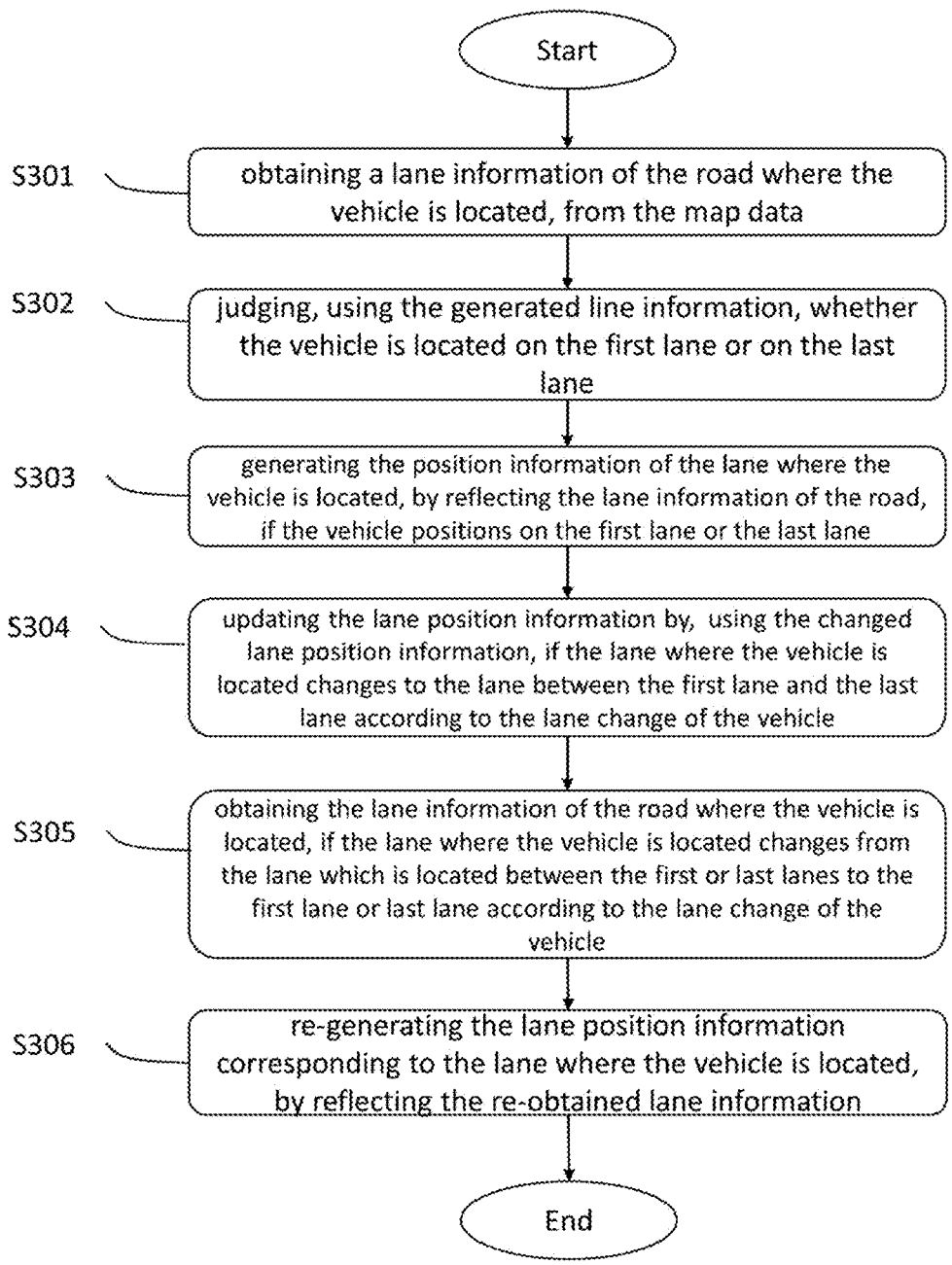
FIG. 8 is a flow chart depicting in detail a lane position information generation method according to an embodiment of the present invention.

FIG. 8 is a flow chart depicting in detail the method for generating a lane position information according to an embodiment of the present invention. Referring to FIG. 8, the lane position information generation unit 145 may obtain a lane information of the road where the vehicle is located, from the map data (S301). Here, the lane information of the road may be a lane information of the road where the driving vehicle is currently located or may include an information on the number of the lanes of the road where the vehicle is located. And, the lane information of the road may be obtained from the map data stored in the storing unit 110 in the electronic apparatus 100 or may be obtained from an external map database DB being separate from the electronic apparatus 100 or may be obtained from another electronic apparatus 100.

And, the lane position information generation unit 145 may judge, using the generated line information, whether the vehicle is located on the first lane or on the last lane (S302). More specifically, the lane position information generation unit 145, as depicted in FIG. 9A, judges whether the vehicle is located on the first lane of the road or on the last lane of the road by reflecting the line information corresponding to the lane in the lane judgment table.

Namely, the lane judgment table may contain the first lane and the last lane which are determined based on the nation, the types and colors of the left line, the types and colors of the right line. Here, the lane judgment table as depicted in FIG. 9A may be provided as examples, and may be set as different values depending on nations or situations for each setting.

Meanwhile, the lane position information generation unit 145 may generate the position information of the lane where the vehicle is located, by reflecting the lane information of the road, if the vehicle is located on the first lane or the last lane (S303). As an example, if it is judged that the vehicle is in the last lane, the lane position information generation unit 145 may generate the lane position information as a N-lane. In addition, if the number of the lanes corresponding to the road is 5, the N-lane may be generated into 5th lane based on the above principle.

And, the lane position information generation unit 145 may update the lane position information by using the changed lane position information, if the lane where the vehicle is located changes to the lane between the first lane and the last lane according to the lane change of the vehicle, (S304). In this case, the lane position information generation unit 145 may judge the departing of the line by using the line information and judges the changes of the lane based on the above judgment. As an example, the lane position information generation unit 145 may update the lane position information from the 5th lane to the 4th lane if it is judged that the vehicle has changed from the 5th lane to the left side lane, which means the lane change by one lane.

And, the lane position information generation unit 145 may obtain again the lane information of the road where the vehicle is located, if the lane where the vehicle is located changes from the lane which is located between the first or last lanes to the first lane or last lane according to the lane change of the vehicle (S305). In addition, the lane position information generation unit 145 may re-generate the lane position information corresponding to the lane where the vehicle is located, by reflecting the re-obtained lane information (S306). As an example, if it is judged that the vehicle changes from the 4th lane to the right side lane, which means the change by one lane, the vehicle has changed to the 5th lane which is the previously set last lane, thus obtaining the lane information of the road where the vehicle currently is located. In addition, if an obtained lane information is the 4th lane, the position information of the lane where the vehicle is located may be re-generated as the 4th lane.

Meanwhile, the lane position information generation method according to an embodiment of the present invention is not limited to FIG. 8. Therefore, the above-described sequences may change according to another embodiment. As an example, the step wherein the lane information of the road where the vehicle is located may be obtained in the step S304. In this case, the lane position information generation unit 145 may generate the position information of the lane where the vehicle is located, if the vehicle is located on the first or last lane. As an example, if it is judged that the vehicle is located on the last lane, the lane position generation unit 145 may generate the lane position information as the N-lane.

And, the lane position information generation unit 45 may update the lane position information using the generated lane position information and the obtained lane information of the road, if the lane where the vehicle is located changes to the lane which is located between the first or last lanes according to the lane change of the vehicle (S304). As an example, the lane position information generation unit 145 may update the lane position information to the 4th lane in such a manner to reflect N=5 which is the information corresponding to the number of lanes to the N−1 lane if it is judged that the vehicle has changed from the N-lane corresponding to the last lane to the left lane, which means the change by one lane.

And, according to another embodiment of the present invention, the lane position information generation unit 145 may judge if the vehicle positions on the first lane, the center lane or the last lane of the road by applying the line information corresponding to the lane where the vehicle positions, to the lane judgment table as depicted in FIG. 9B. However, in this case, it is hard to accurately know the lane where the vehicle positions, among the multiple center lanes if the center lane of the road is provided multiples in number (for example, the number of lanes is 4 or more than 4). The embodiment of the present invention may preferably use the method as depicted in FIG. 8.

Meanwhile, the route information generation unit 146 may generate the route information for the road guide to the point that the driver of the vehicle has set, by using the map data and the traffic flow-related information, etc.

And, the distance information generation unit 147 may generate the distance information to another vehicle which is located in front of the vehicle. As an example, the distance information generation unit 147 may determine the region of interest including the forward vehicle, from the driving-related image data of the vehicle and may generate the distance information to another vehicle which is located in front of the vehicle, using the image data of the determined region of interest. As another example, the distance information generation unit 147 may generate the distance information to another vehicle which is located in front of the vehicle by receiving the sensing information from the distance detection sensor installed at a front portion of the vehicle, for example, the infrared ray sensor, the ultrasonic wave sensor, etc.

So, the guide-related information generation unit 140 may generate the information which may be used to perform a driving-related guide including at least one of the signal type information of the signal lamp, the line information with respect to the lane where the vehicle is located, the position information of the lane where the vehicle is located, the distance information to another vehicle that is located in front of the vehicle, and the route information for road guide.

Figure 10:
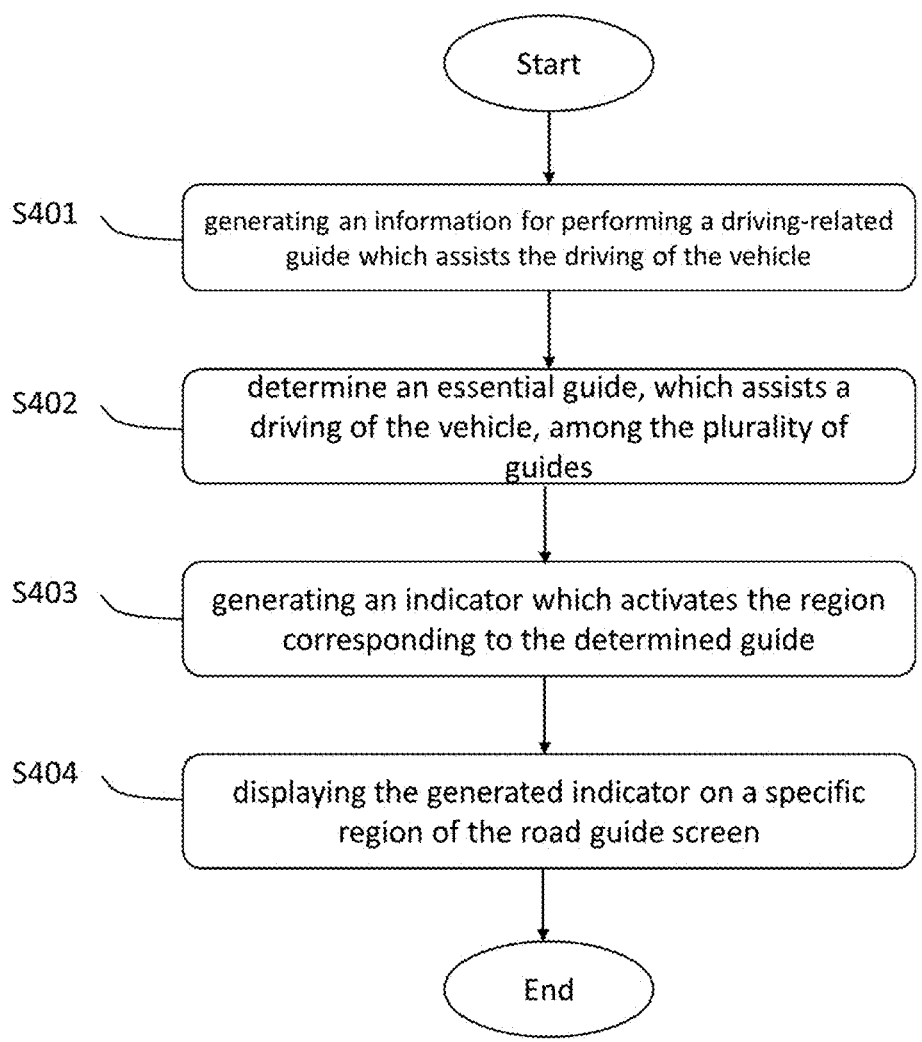
FIG. 10 is a flow chart depicting in detail a control method of an electronic apparatus according to an embodiment of the present invention.

FIG. 10 is a flow chart which depicts in detail the control method of the electronic apparatus according to an embodiment of the present invention. Referring to FIG. 10, the guide-related information generation unit 140 may generate an information for performing a driving-related guide which assists the driving of the vehicle (S401).

And, the guide-related information generation unit 140 may determine an essential guide, which assists a driving of the vehicle, among the line departure guide, the forward vehicle collision prevention guide, the signal change guide of the signal lamp, the lane change guide, by using the generated information (S402). For convenient descriptions, the signal change guide will be described as an example.

In a state that the route information of the vehicle which stops at a intersection is a straight direction, when the signal type information changes from the stop signal to the left turn signal, the guide-related information generation unit 140 may judge that a signal change guide is not necessary. Or, in a state that the route information of the vehicle which stops at the cross is a straight direction, when the generated signal type information changes from the stop signal to the straight signal, the guide-related information generation unit 140 may judge that a signal change guide is necessary.

Also, the lane change guide will be described with another example.

In a state that the route information of the running vehicle is a left turn direction on a specific distance ahead, if the lane position information is not the left turn lane, the guide-related information generation unit 140 may judge that the lane change guide is necessary. Or, in a state that the route information of the running vehicle is a left turn direction on a specific distance ahead, if the lane position information is the left turn lane, the guide-related information generation unit 140 may judge that the lane change guide is not necessary.

And, the indicator generation unit 150 may generate an indicator which activates the region corresponding to the determined guide (S403). In details, the indicator generation unit 150 may generate an indicator which activates the region corresponding to the guide which needs to be done and does not activate the region corresponding to the guide which does not need to be done.

And, the display unit 131 may display overlapping the generated indicator on a specific region of the road guide screen (S404). In detail, the display unit 131 may display an AR road guide screen which displays overlapping the generated indicator on a taken image which corresponds to the forward scene of the running vehicle in cooperation with the AR provision unit 160. Also, the display unit 131 may display a 2D or 3D road guide screen on which the generated indicator is displayed overlapping on a map data of the 2D or 3D.

Figure 11:
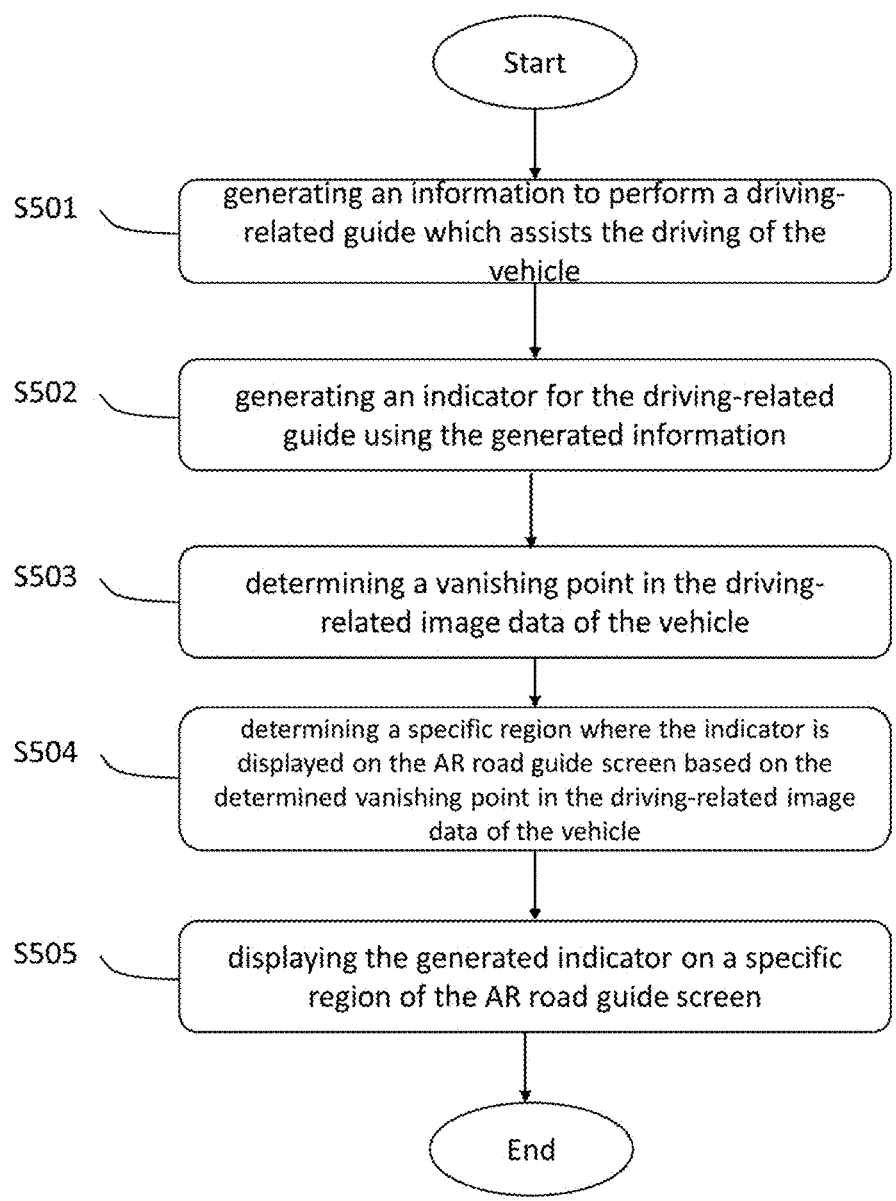
FIG. 11 is a flow chart depicting in detail a control method of an electronic apparatus according to an embodiment of the present invention.

FIG. 11 is a flow chart for describing in detail the control method of an electronic apparatus according to an embodiment of the present invention. Referring to FIG. 11, the guide-related information generation unit 140 may generate an information to perform a driving-related guide which assists the driving of the vehicle (S501).

And, the indicator 150 may generate an indicator for the driving-related guide using the generated information (S502).

And, the indicator generation unit 150 may determine a vanishing point in the driving-related image data of the vehicle (S503). In detail, the indicator generation unit 150 may extracts a line from the photographed image by the camera during the driving of the vehicle, and may extend the extracted line, and may determine the point where the extracted line crosses each other, as a vanishing point.

And, the indicator generation unit 150 may determine a specific region where the indicator is displayed on the AR road guide screen based on the determined vanishing point in the driving-related image data of the vehicle (S504). In detail, the indicator generation unit 150 may determine the region which is formed at a specific distance above the determined vanishing point as a specific region where the indicator is displayed. Namely, according to the AR wherein an additional information is displayed on the screen which includes a real world that the user is actually seeing, the image corresponding to the actual road, the actual forward vehicle, etc. is displayed in the lower region of the vanishing point, but the image which is necessary for the driving is not displayed in the upper region, except for the images which correspond to the actual signal lamp. So, the indicator generation unit 150 may determine the region which is formed at a specific distance above the determined vanishing point as a specific region in which the indicator is displayed.

And, the display unit 131 may display overlapping the generated indicator on a specific region of the AR road guide screen (S505).

Figure 12:
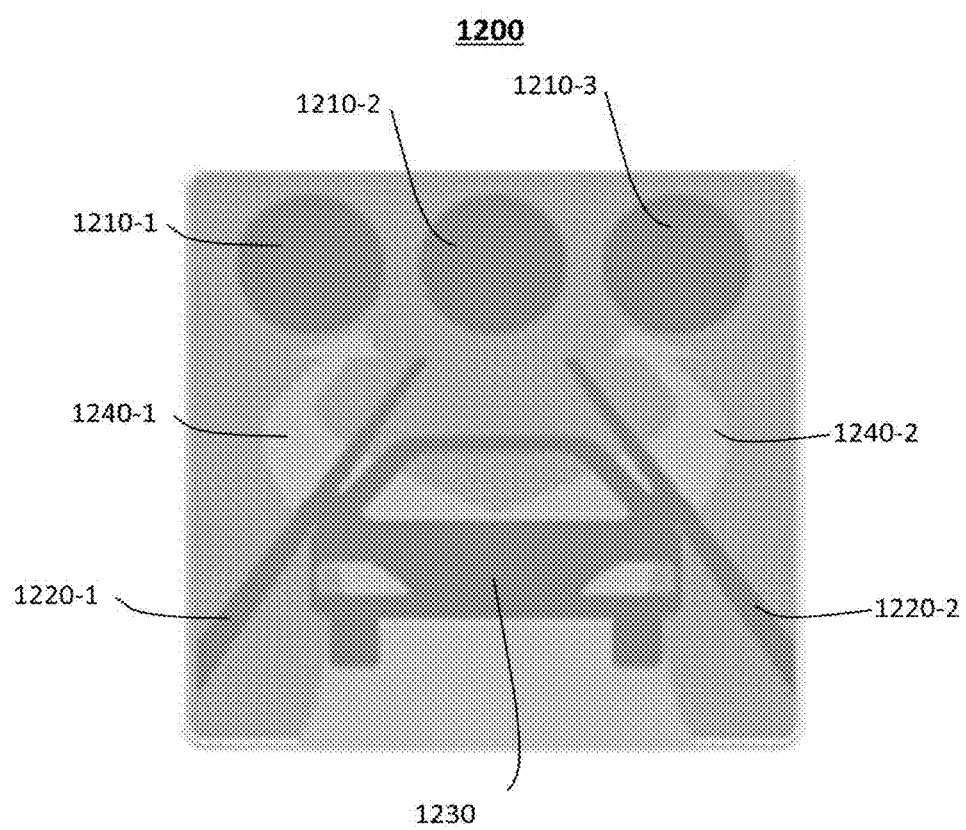
FIG. 12 is a view depicting an indicator according to an embodiment of the present invention.

FIG. 12 is a view depicting the indicator of an embodiment of the present invention. FIG. 12 shows an indicator wherein all the multiple guide regions are inactivated. Here, the indicator 1200 may includes, but not limited to, a first region 1230 which performs a forward vehicle collision prevention guide, second regions 1220-1 and 1220-2 which is formed at left and right sides of the first region and perform the line departure guide, third regions 1210-1, 1210-2 and 1210-3 which are formed at the top of the first and second regions and perform signal change guides, and fourth regions 1240-1 and 1240-2 which pass through the second region and perform the lane change guide.

Namely, each position of the multiple guide region in the indicator may be designed to correspond to an actual road situation.

The form of the indicator in FIG. 12 is not limited, and according to another example, any one of the first region to the fourth region may be omitted. According to another example, a guide region, for example, a lane guide which guides the lane where the vehicle positions is in which lane, except for the first region to the fourth region.

Meanwhile, when an guide which needs to be done among the multiple guides is determined, the indicator generation unit 150 may generate an indicator which activates the region corresponding to the guide which needs to be done among the multiple guides. This operation will be described in detail with reference to FIGS. 13A to 16B.

Figure 13A:
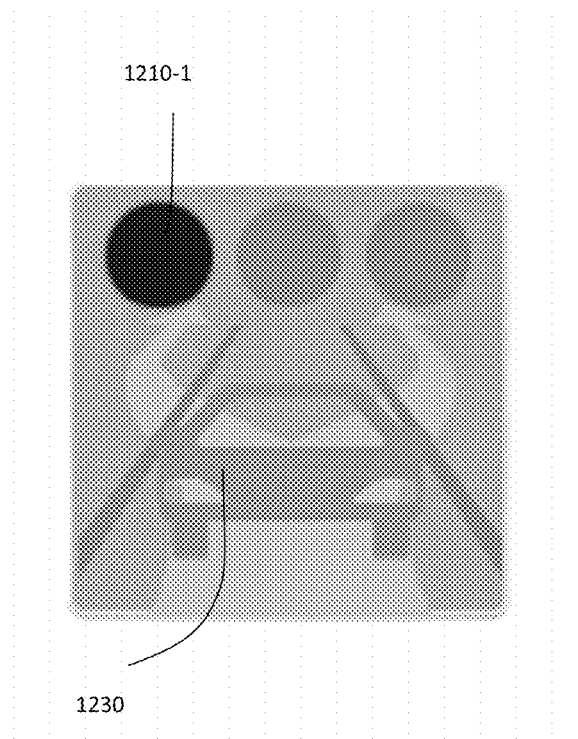
FIGS. 13A and 13B are views depicting an indicator for the sake of a signal change guide and a forward vehicle collision prevention guide according to an embodiment of the present invention.
Figure 13B:
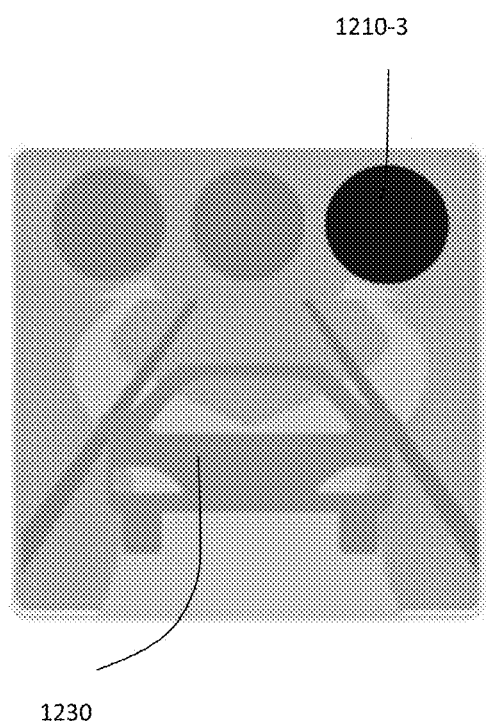

FIGS. 13A and 13B are views depicting an indicator for the signal change guide and the forward vehicle collision prevention guide according to an embodiment of the present invention. In detail, if the distance information to the vehicle which is located in front of the vehicle is longer than a specific set distance, and the signal type information is a stop signal, as depicted in FIG. 13A, the indicator generation unit 150 may generate an indicator which activates the first region 1230 with a color which shows that the distance to the forward vehicle is enough and which activates the stop signal region 1210-1 of the third region which performs the signal change guide.

And, if the signal state of the signal lamp changes from the stop signal to the straight signal, the indicator generation unit 150, as depicted in FIG. 13B, may generate an indicator which activates the straight signal region 1210-3 of the third region which performs the signal change guide.

Figure 14A:
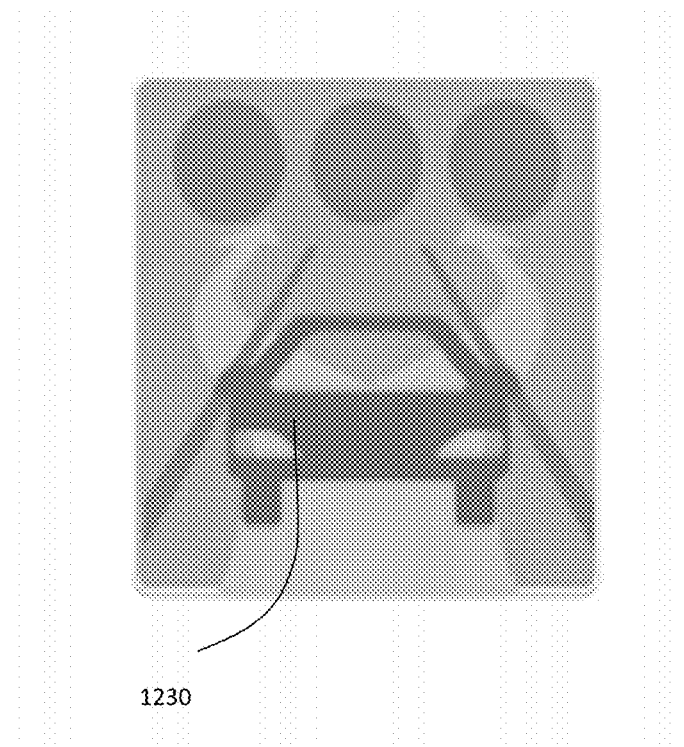
FIGS. 14A and 14B are views depicting an indicator for the sake of a forward vehicle collision guide according to an embodiment of the present invention.
Figure 14B:
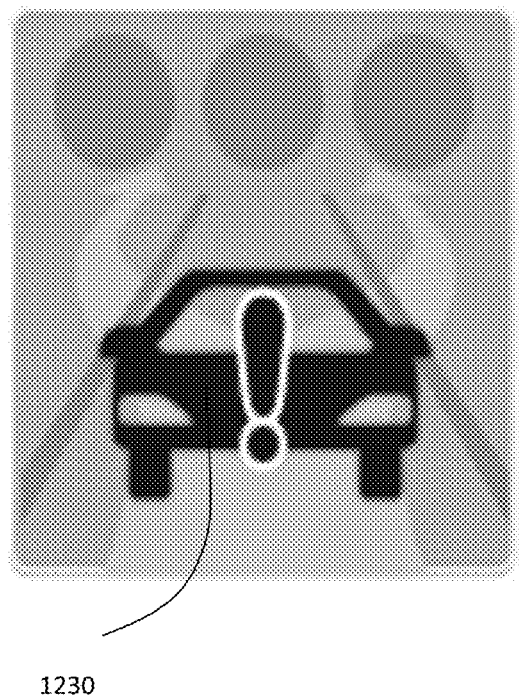

FIGS. 14A and 14B are views depicting the indicator for a forward vehicle collision prevention guide according to an embodiment of the present invention. In detail, if the distance information to the vehicle which is located in front of the vehicle is shorter than the previously set distance, the indicator generation unit 150, as depicted in FIG. 14A, may generate an indicator which activates the first region 1230 with a color which shows that the distance to the forward vehicle is close.

And, if the distance information to the vehicle which is located in front of the vehicle is very close, the indicator generation unit 150, as depicted in FIG. 14B, may generate an indicator which activates the first region 1230 with a color which shows that the distance to the forward vehicle is very close.

Figure 15A:
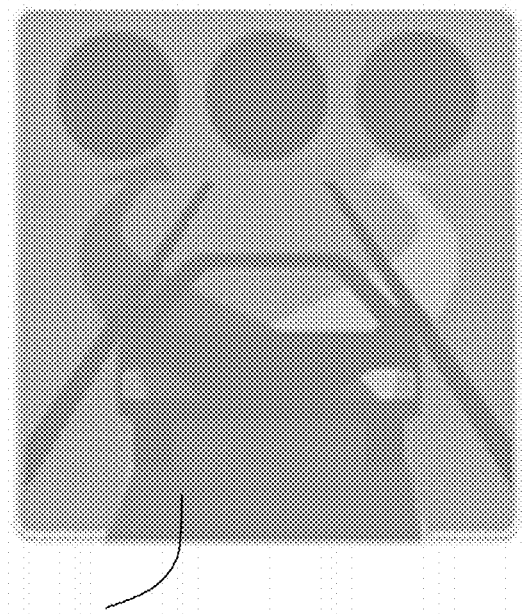
FIGS. 15A and 15B are views depicting an indicator for a lane change guide according to an embodiment of the present invention.
Figure 15B:
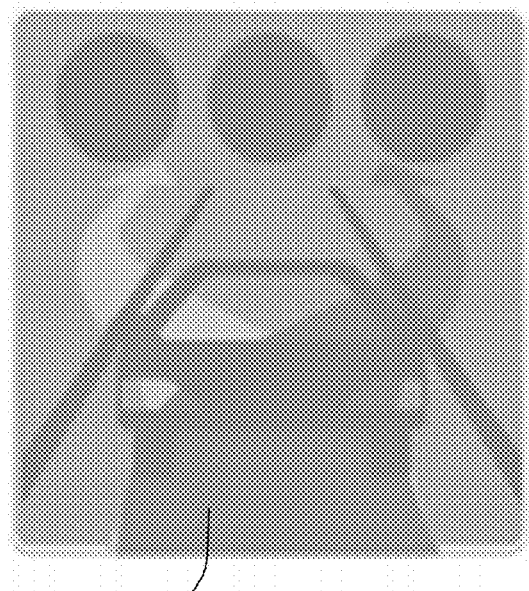

FIGS. 15A and 15B are views depicting an indicator for the lane change guide according to an embodiment of the present invention. In detail, if the vehicle needs to change the lane to the left lane, the indicator generation unit 150, as depicted in FIG. 15A, may generate an indicator which activates the left lane change guide of the fourth region 1240-1 which guides the change to the left lane.

And, if the vehicle needs to change from the current lane to the right lane, the indicator generation unit 150, as depicted in FIG. 15B, may generate an indicator which activates the right lane change guide region 1240-2 of the fourth region which guides the change to the right lane.

Figure 16A:
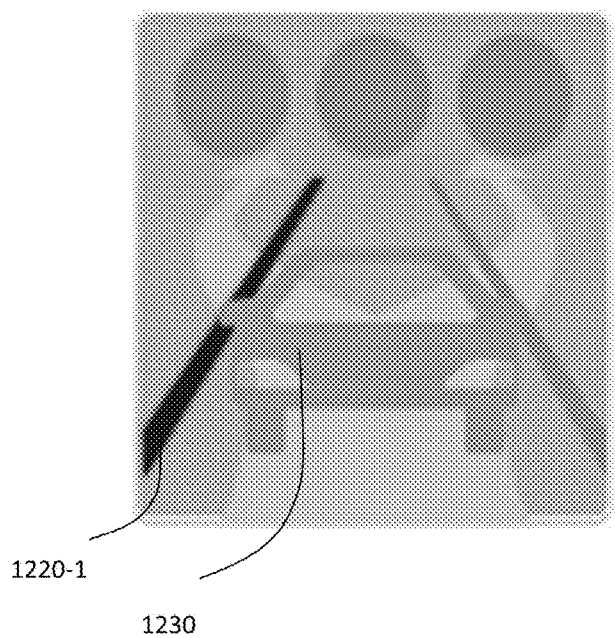
FIGS. 16A and 16B are views depicting an indicator for a line departing prevention guide and a forward vehicle collision guide according to an embodiment of the present invention.
Figure 16B:
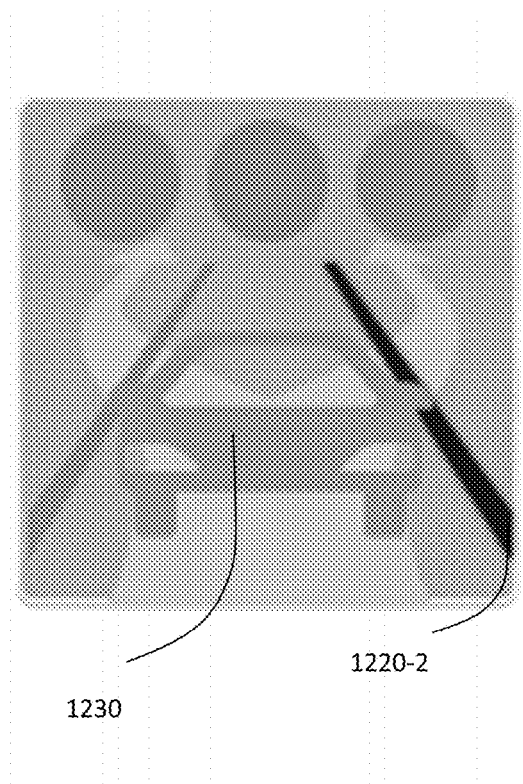

FIGS. 16A and 16B are views depicting the indicator for the line departing prevention guide and the forward vehicle collision prevention guide according to an embodiment of the present invention. In detail, if the distance information to the vehicle which is located in front of the vehicle is longer than the previously set distance, and the vehicle departs from the left line, the indicator generation unit 150, as depicted in FIG. 16A, may generate an indicator which activate the first region 1230 with a color which shows that the distance to the forward vehicle is enough, and activates the left line departure guide region 1220-1 of the second region.

And, if the distance information to the vehicle which is located in front of the vehicle is longer than the previously set distance, and the vehicle departs from the right line, the indicator generation unit 150, as depicted in FIG. 16B, may generate an indicator which activates the first region 130 with a color which shows that the distance to the forward vehicle is enough and activates the right line departure guide region 1220-2 of the second region which performs the line departure guide.

Figure 17:
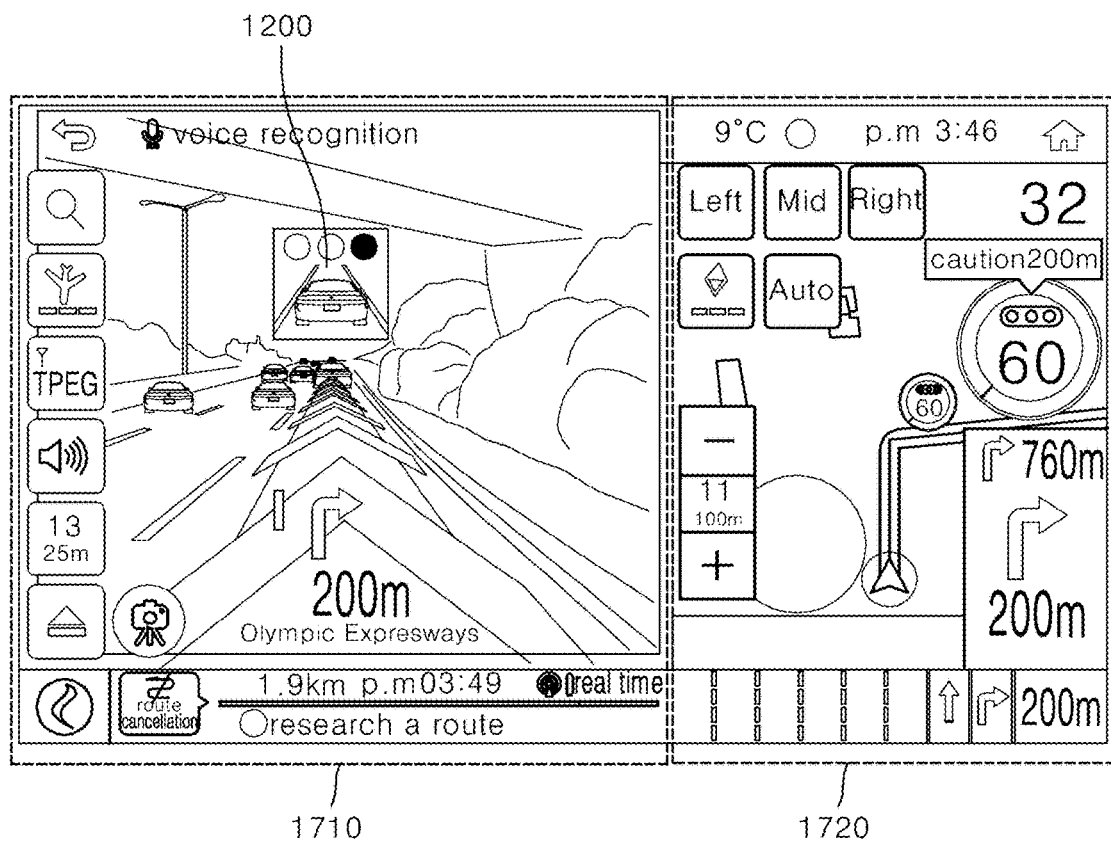
FIG. 17 is a view illustrating a road guide screen according to an embodiment of the present invention.

FIG. 17 is a view depicting the road guide screen according to an embodiment of the present invention. Referring to FIG. 17, the road guide screen may display together an AR road guide screen 1710 which displays overlapping the generated indicator 1200 on the image corresponding to the forward scene of the running vehicle, and a 2D or 3D road guide map 1720 which performs the road guide in the map data of the 2D or 3D.

And, the indicator 1710 may be displayed on the region on the AR road guide screen 1710 which is formed at a specific distance above the vanishing point.

Figure 18:
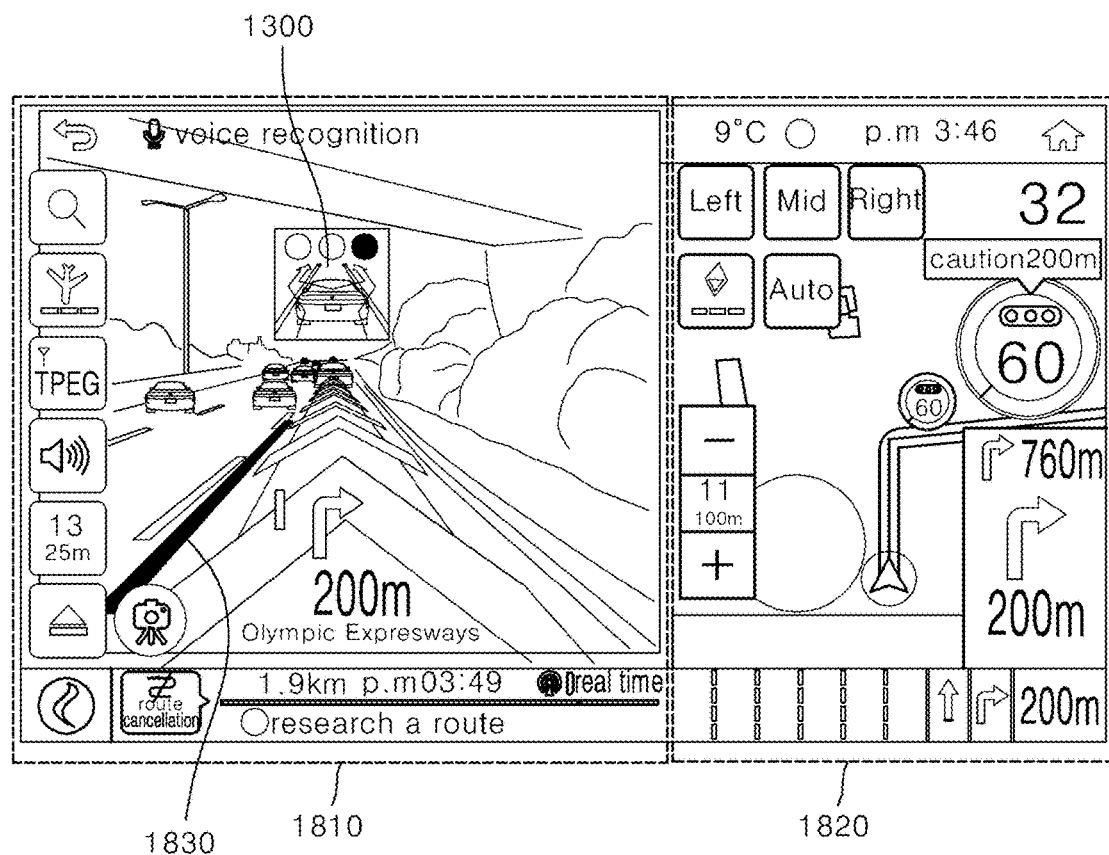
FIG. 18 is a view illustrating a road guide screen according to another embodiment of the present invention.

FIG. 18 is a view depicting a road guide screen according to another embodiment of the present invention. Referring to FIG. 18, the indicator 1300 according to another embodiment of the present invention may include, but not limited to, a first region for performing a forward collision prevention guide, a third region which is formed at the top of the first region and performs a signal change guide, and a fourth region for performing the lane change guide.

In this case, the second region 1830 for the line departure guide may be formed at the portion of the line of the AR road guide screen 1810. Namely, if the vehicle departs from the left line, the portion of the left line of the lane where the vehicle is located, can be activated on the AR road guide screen 1810, and if the vehicle departs from the right line, the portion of the right line of the lane where the vehicle is located, may be activated on the AR road guide screen 1810.

Figure 19:
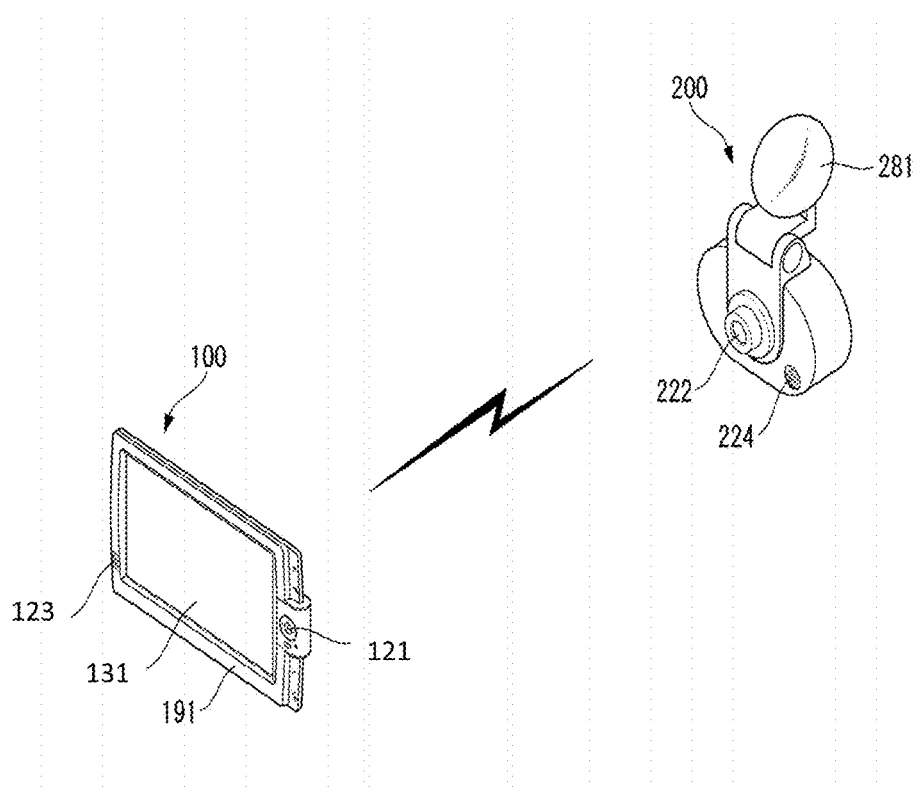
FIG. 19 is a view depicting an implementation form in case where a camera and an electronic apparatus are separate types according to an embodiment of the present invention.

FIG. 19 is a view depicting an implementation form wherein the camera and the electronic apparatus are separate types according to an embodiment of the present invention. Referring to FIG. 19, a vehicle black box 200 which is provided separate from the vehicle navigation 100 may constitute the system according to an embodiment of the present invention using the wired/wireless communication method.

The vehicle navigation 100 may include, but not limited to a display unit 145 provided at a front portion of a navigation housing 191, a navigation controlling key 193, and a navigation microphone 195.

The vehicle black box 200 may obtain a data of a vehicle during the running or stop of the vehicle. Namely, it is possible to photograph the images during the running of the vehicle and the images even when the vehicle is parked. The quality of the images obtained through the vehicle black box 200 may be constant or vary. As an example, the quality of the images before or after the occurrence of an accident may be high, and in the normal occasions, the quality of the images is low so as to minimize the required storing space since it needs to store important images.

The vehicle black box 200 may include, but not limited to, a black box camera 222, a black box microphone 224 and an attaching unit 281.

Meanwhile, FIG. 19 depicts that the vehicle black box 200 provided separate from the vehicle navigation 100 is connected in a wired/wireless communication method, but the vehicle navigation 100 and the vehicle black box 200 may not be connected in the wired/wireless communication method. In this case, if a storing medium capable of storing the photographed images of the black box 200 is inserted in the electronic apparatus 100, the electronic apparatus 100 may have a function of the vehicle navigation 100 or the vehicle navigation 100 may be integrally provided. This configuration, as depicted in FIGS. 13A and 13B, will be described in detail.

Figure 20:
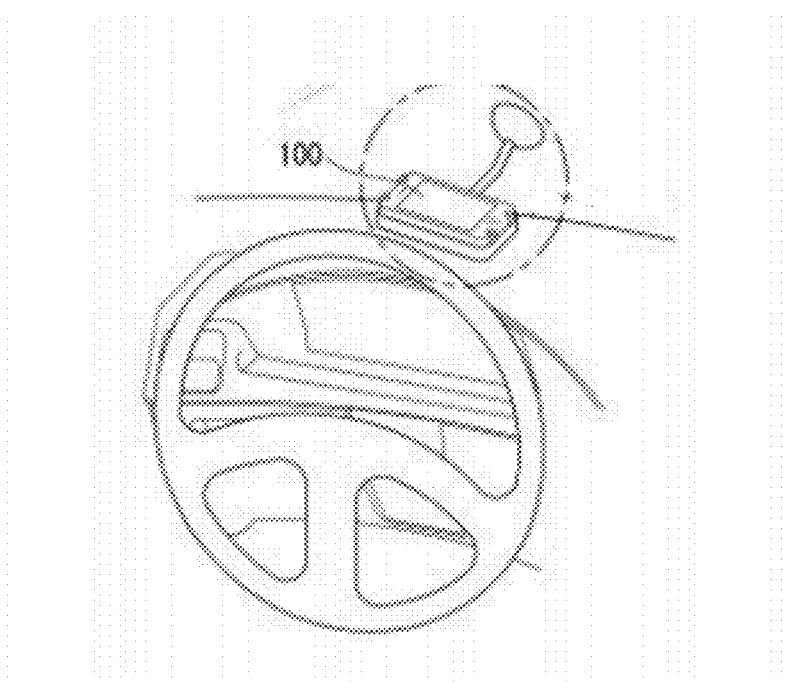
FIG. 20 is a view illustrating an implementation form in case where a camera and an electronic apparatus are integrated types according to an embodiment of the present invention.

FIG. 20 is a view depicting the implementation form wherein the camera and the electronic apparatus are integral, according to an embodiment of the present invention. Referring to FIG. 20, if the electronic apparatus has a camera function, the user can install the electronic apparatus which allows a camera portion of the electronic apparatus to photograph the forward scenes of the vehicle and the display portion of the electronic apparatus to recognize the user, thus implementing the system according to an embodiment of the present invention.

Figure 21:
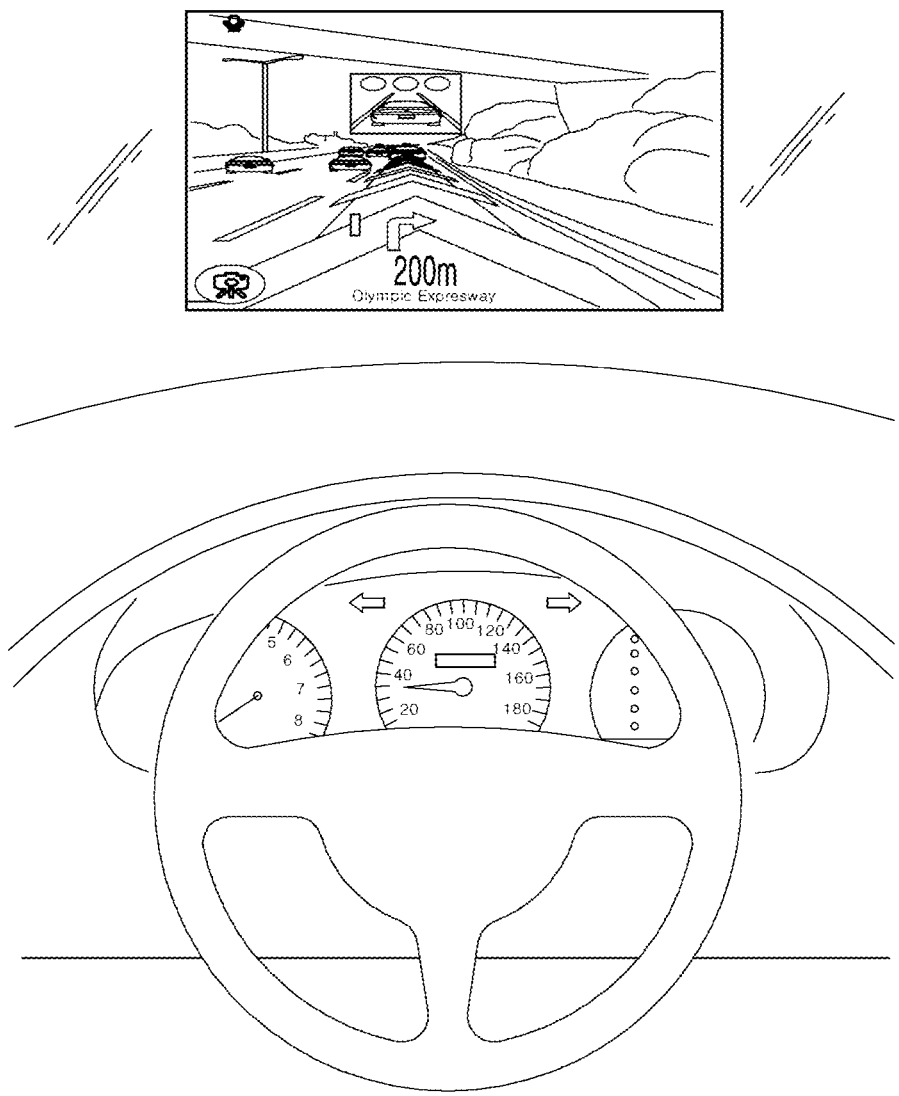
FIG. 21 is a view illustrating an implementation form which uses a HUD (Head-UP Display) and an electronic apparatus according to an embodiment of the present invention.

FIG. 21 is a view depicting the implementation form by using the HUD (Head-UP Display) and the electronic apparatus according to an embodiment of the present invention. Referring to FIG. 21, the electronic apparatus may display the AR guide screen on the head-up display with the help of the head-up display and the wired/wireless communication.

Meanwhile, the control method of the electronic apparatus according to various embodiments of the present invention are implemented in the form of program codes, which may be provided to each server or device in a state where such program devices are stored in various non-transitory computer readable medium.

The non-transitory computer readable medium is not a medium, for example, a register, a cash, a memory, etc., which is designed to store for short time period, but a medium which may store data semi-permanently and may be read by a device. In detail, the above various applications or programs may be stored in the non-transitory readable medium, for example, CD, DVD, a hard disk, a blue ray disk, USB, a memory card, ROM, etc.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A control method of an electronic apparatus, the method comprising:
    determining, by one or more processors, at least one guide that is displayed to assist a driving of a vehicle, among a plurality of driving-related guides;
    generating, by the one or more processors, an indicator including a plurality of guide regions; and
    displaying the generated indicator on a forward image of the vehicle on an augmented reality (AR) road guide screen, wherein the plurality of guide regions of the indicator are controlled according to the at least one guide, and wherein the plurality of guide regions of the indicator comprise at least two different guide regions among a forward vehicle collision prevention guide region, a line departure guide region, a signal change guide region, or a lane change guide region.

2. The method of claim 1, further comprising a step for generating information for performing the plurality of driving-related guides which assist the driving of the vehicle,
    wherein the generated information for performing the plurality of driving-related guides includes at least one among signal information of a signal lamp, line information with respect a lane on which the vehicle is located, position information of a lane on which the vehicle is located, distance information to another vehicle positioning in front of the vehicle, and route information for the at least one guide.

3. The method of claim 2, wherein the step for determining the at least one guide determines the at least one guide among a line departure guide, a forward vehicle collision prevention guide, a signal change guide of a signal lamp, and a lane change guide by using the generated information.

4. The method of claim 1, wherein the step of the displaying displays the generated indicator on the forward image generated based on an image acquired from a camera of the vehicle in an overlapping manner.

5. The method of claim 1, wherein the indicator comprises:
    a first guide region corresponding to the forward vehicle collision prevention guide region;
    a second guide region which is formed at left and right sides of the first guide region and corresponds to the line departure guide region;
    a third guide region which is formed at tops of the first and second guide regions and corresponds to the signal change guide region; and
    a fourth guide region which is formed passing through the second guide region and corresponds to the lane change guide region.

6. The method of claim 1, wherein the indicator comprises:
    a first guide region corresponding to the forward vehicle collision prevention guide region;
    a third guide region which is formed at a top of the first guide region and corresponds to the signal change guide region; and
    a fourth guide region corresponding to the lane change guide region,
    wherein the second guide region for the line departure guide is formed at a portion of the line of the AR road guide screen.

7. The method of claim 1, wherein the step of the generating the indicator generates the indicator which activates a region corresponding to the determined at least one guide region.

8. The method of claim 4, further comprising:
    determining a vanishing point in the forward image in relation with the driving of the vehicle; and
    determining a specific region for displaying the indicator on the AR road guide screen based on the determined vanishing point.

9. The method of claim 8, wherein the step of the determining the specific region to display the indicator determines the specific region on which the indicator is displayed, wherein the specific region is formed at a specific distance above the determined vanishing point.

10. An electronic apparatus including a processor, the electronic apparatus comprising:
a display unit configured to display a screen;
a guide-related information generation processor configured to determine at least one guide that is displayed to assist a driving of a vehicle, among a plurality of driving-related guides; an indicator generation processor configured to generate an indicator including a plurality of guide regions; and
a control processor configured to control the display unit and to display the generated indicator on a specific region of a forward image of the vehicle on an augmented reality (AR) road guide screen, wherein the plurality of guide regions of the indicator are controlled according to the at least one guide, and wherein the plurality of guide regions of the indicator comprise at least two different guide regions among a forward vehicle collision prevention guide region, a line departure guide region, a signal change guide region, or a lane change guide region.

11. The apparatus of claim 10, wherein the guide-related information generation processor generates information for performing plurality of driving-related guides which assist the driving of the vehicle, wherein the driving-related guide includes at least one among signal information of a signal lamp, line information with respect to a lane on which the vehicle is located, position information of a lane where the vehicle is located, distance information to another vehicle positioning in front of the vehicle, and route information for the at least one guide.

12. The apparatus of claim 11, wherein the guide-related information generation processor determines the at least one guide that needs to be displayed, which assists the driving of the vehicle, among a line departure guide, a forward vehicle collision prevention guide, a signal change guide of a signal lamp, a lane change guide, and a lane departing guide by using the generated information.

13. The apparatus of claim 10, wherein the control processor controls the display unit to display the generated indicator on the forward image generated based on an image acquired from a camera of the vehicle in an overlapping manner.

14. The apparatus of claim 13, wherein the indicator generation processor determines the specific region for displaying the indicator on the AR road guide screen based on a vanishing point, wherein the vanishing point is determined from the image in relation with the driving of the vehicle.

15. The apparatus of claim 14, wherein the indicator generation processor determines the specific region where the indicator displays, wherein the specific region is formed at a specific distance above the determined vanishing point.

16. The apparatus of claim 10, wherein the indicator comprises:
a first guide region corresponding to the forward vehicle collision prevention guide region;
a second guide region which is formed at left and right sides of the first guide region and corresponds to the line departure guide region;
a third guide region which is formed at tops of the first and second guide regions and corresponds to the signal change guide region; and
a fourth guide region which is formed passing through the second guide region and corresponds to the lane change guide region.

17. The apparatus of claim 16, wherein the indicator generation processor generates the indicator which activates a region corresponding to the determined at least one guide.

18. The apparatus of claim 10, wherein the indicator comprises:
a first guide region corresponding to the forward vehicle collision prevention guide region;
a third guide region which is formed at a top of the first guide region and corresponds to the signal change guide region; and
a fourth guide region corresponding to the lane change guide,
wherein the second guide region for the line departure guide is formed at a portion of a line of the AR road guide screen.

19. A non-transitory computer readable recording storage medium containing instructions that, when executed by one or more processors, cause the one or more processors to perform a method, the method comprising:
determining, by the one or more processors, at least one guide that is displayed to assist a driving of a vehicle, among a plurality of driving-related guides;
generating, by the one or more processors, an indicator including a plurality of guide regions; and
displaying the generated indicator on a forward image of the vehicle on an augmented reality (AR) road guide screen, wherein the plurality of guide regions of the indicator are controlled according to the at least one guide, and wherein the plurality of guide regions of the indicator comprise at least two different guide regions among a forward vehicle collision prevention guide region, a line departure guide region, a signal change guide region, or a lane change guide region.

* * * * *